US012561596B2

(12) United States Patent
Abdo

(10) Patent No.: US 12,561,596 B2
(45) Date of Patent: Feb. 24, 2026

(54) NONDEGENERATE THROUGH QUANTUM-LIMITED AMPLIFIER

(71) Applicant: International Business Machines Corporation, Armonk, NY (US)

(72) Inventor: Baleegh Abdo, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 753 days.

(21) Appl. No.: 17/962,331

(22) Filed: Oct. 7, 2022

(65) Prior Publication Data

US 2024/0119332 A1    Apr. 11, 2024

(51) Int. Cl.
*G06N 10/40*        (2022.01)

(52) U.S. Cl.
CPC ..................................... *G06N 10/40* (2022.01)

(58) Field of Classification Search
USPC ......................................................... 716/100
See application file for complete search history.

(56) References Cited

U.S. PATENT DOCUMENTS

| | | |
|---|---|---|
| 9,589,236 B1 | 3/2017 | Abdo |
| 9,735,776 B1 | 8/2017 | Abdo et al. |
| 9,870,536 B1 | 1/2018 | Abdo |
| 10,103,730 B1 | 10/2018 | Abdo |
| 10,164,724 B2 | 12/2018 | Abdo |
| 10,230,038 B2 | 3/2019 | Abdo |
| 10,629,978 B2 * | 4/2020 | Abdo ................ H10N 60/0912 |

| | | |
|---|---|---|
| 2016/0308502 A1 | 10/2016 | Abdo et al. |
| 2022/0004075 A1 | 1/2022 | Cable |
| 2022/0140927 A1 | 5/2022 | Bronn et al. |

FOREIGN PATENT DOCUMENTS

CN        108140716 B  * 10/2021  ............. G06N 10/40

OTHER PUBLICATIONS

B. Abdo et al., "Active Protection of a Superconducting Qubit with an Interferometric Josephson Isolator," Nature Communications, Jul. 17, 2019, 10 pages, vol. 10, No. 3154.
B. Abdo et al., "High-Fidelity Qubit Readout Using Interferometric Directional Josephson Devices," PRX Quantum, Dec. 28, 2021, 34 pages, vol. 2, No. 040360.

(Continued)

*Primary Examiner* — Brian Ngo
(74) *Attorney, Agent, or Firm* — Erik Johnson; Ryan, Mason & Lewis, LLP

(57)        ABSTRACT

A device comprises a nondegenerate through quantum-limited amplifier comprising a first port, a second port, and a third port. The first port is configured to receive first quantum signals which comprise frequencies within a first frequency band. The second port is configured to receive second quantum signals which comprise frequencies within a second frequency band, which is non-overlapping with the first frequency band. The nondegenerate through quantum-limited amplifier is configured to amplify the first quantum signals, amplify and convert the frequencies of the second quantum signals to frequencies within the first frequency band, and output the amplified first quantum signals and the amplified frequency-converted second quantum signals from the third port.

20 Claims, 12 Drawing Sheets

(56)  References Cited

OTHER PUBLICATIONS

B. Abdo et al., "Nondegenerate Three-Wave Mixing with the Josephson Ring Modulator," Physical Review B, arXiv:1208. 3142v1, Aug. 15, 2012, 21 pages.

C. Macklin et al., "A Near-Quantum-Limited Josephson Traveling-Wave Parametric Amplifier," Science, Oct. 16, 2015, pp. 307-310, vol. 350, No. 6258.

B. Abdo et al., "Multi-Path Interferometric Josephson Directional Amplifier for Qubit Readout," Quantum Science and Technology, arXiv:1710.02521v1, Oct. 8, 2017, 17 pages.

B. Abdo et al., "Full Coherent Frequency Conversion between Two Microwave Propagating Modes," Physical Review Letters, arXiv:1212. 2231v1, Dec. 10, 2012, 21 pages.

N. Didier et al.., "Remote Entanglement Stabilization and Distillation by Quantum Reservoir Engineering," Physical Review A, arXiv:1703.03379v2, Jan. 18, 2018, 5 pages.

* cited by examiner

100

<u>300</u>

400

DEVICE TRANSMISSION
(PUMP OFF)
400

$$S_{21} = i$$
$$S_{12} = i$$
$$S_{34} = S_{43} = i$$
$$S_{31} = S_{13} = S_{41} = S_{14} = 0$$
$$S_{32} = S_{23} = S_{42} = S_{24} = 0$$

DEVICE REFLECTION
(PUMP OFF)
<u>400</u>

$S_{11} = 0$
$S_{22} = S_{33} = S_{44} = 0$

<u>530</u>

$$S = i \begin{pmatrix} 0 & 1 & 0 & 0 \\ 1 & 0 & 0 & 0 \\ 0 & 0 & 0 & 1 \\ 0 & 0 & 1 & 0 \end{pmatrix}$$

DEVICE SCATTERING MATRIX
(PUMP ON)

<u>400</u>

$$r_1 = r_2 = r$$
$$s_1 = s_2 = s$$
$$\phi_{p1} = \phi_{p2} = \phi_p$$
$$r^2 - s^2 = 1$$
$$r = \sqrt{G}$$
$$s = \sqrt{G-1}$$

$$\underline{540}$$

$$S = i \begin{pmatrix} 0 & r & 0 & -ise^{-i\phi_p} \\ r & 0 & -ise^{-i\phi_p} & 0 \\ 0 & ise^{i\phi_p} & 0 & r \\ ise^{i\phi_p} & 0 & r & 0 \end{pmatrix}$$

600

700

800

900

NONDEGENERATE THROUGH QUANTUM-LIMITED AMPLIFIER

BACKGROUND

This disclosure relates generally to quantum computing and, in particular, quantum systems and devices which implement a frequency-multiplexed readout system for reading the quantum states of superconducting quantum bits (qubits). A superconducting quantum computing system is implemented using circuit quantum electrodynamics (QED) devices, which utilize the quantum dynamics of electromagnetic fields in superconducting circuits, which include superconducting qubits, to generate and process quantum information. In general, superconducting qubits are electronic circuits which are implemented using components such as superconducting tunnel junctions (e.g., Josephson junctions), inductors, and/or capacitors, etc., and which behave as quantum mechanical anharmonic (non-linear) oscillators with quantized states, when cooled to cryogenic temperatures.

A qubit can be effectively operated as a two-level system using a ground state and first excited state of the qubit due to the anharmonicity imparted by a non-linear inductor element (e.g., Josephson inductance) of the qubit, which allows the ground and first-excited states to be uniquely addressed at a transition frequency of the qubit, without significantly disturbing the higher-excited states of the qubit. Various types of quantum information processing operations can be implemented using a superconducting quantum processor which comprises multiple superconducting qubits, wherein the superconducting qubits can be coherently controlled, placed into quantum superposition states (via, e.g., single-gate operations), exhibit quantum interference effects, and become entangled with one another (via, e.g., entanglement gate operations). As quantum processors are scaled with increasing numbers of superconducting qubits and higher integration densities, unwanted crosstalk between qubits and other superconducting components becomes increasingly problematic.

In quantum computing systems, a frequency-multiplexed readout system is typically implemented to scale-up a number of qubit readout signals per readout chain for reading the quantum states of superconducting qubits in relatively large superconducting quantum computers. More specifically, in a frequency-multiplexed readout system, multiple readout resonators (with different resonance frequencies) are coupled to separate qubits and commonly coupled to a communication bus. The communication bus is configured to allow the transmission of multiple readout signals with readout frequencies which match the resonance frequencies of the readout resonators, and, thus simultaneously read out the quantum states of multiple qubits using one input and one output line. One main constraint for the frequency-multiplexed readout system is the minimum frequency spacing which is needed between the resonant frequencies of the readout resonators (which are commonly coupled to a single communication bus) to reduce an amount of crosstalk between the readout resonators below a certain threshold. The minimum frequency spacing that is needed to reduce crosstalk between readout resonators places a constraint on the maximum number of readout signals that can be carried by one pair of input and output lines for a given operating bandwidth of the readout signal path.

SUMMARY

Exemplary embodiments of the disclosure include nondegenerate through quantum-limited amplifiers that are utilized in quantum computing applications such as frequency-multiplexed readout systems for reading the quantum states of superconducting quantum bits, facilitating entanglement gate operations between remote quantum bits, etc.

An exemplary embodiment includes a device which comprises a nondegenerate through quantum-limited amplifier comprising a first port, a second port, and a third port. The first port is configured to receive first quantum signals which comprise frequencies within a first frequency band. The second port is configured to receive second quantum signals which comprise frequencies within a second frequency band, which is non-overlapping with the first frequency band. The nondegenerate through quantum-limited amplifier is configured to amplify the first quantum signals, amplify and convert the frequencies of the second quantum signals to frequencies within the first frequency band, and output the amplified first quantum signals and the amplified frequency-converted second quantum signals from the third port.

Advantageously, the nondegenerate through quantum-limited amplifier is configured to enable frequency-multiplexing of the first quantum signals and the second quantum signals, which have frequencies within non-overlapping first and second frequency bands, to thereby provide an increased spectral density of the amplified first quantum signals and amplified frequency-converted second quantum signals, which are within the first frequency band, despite frequency separation constraints associated with generation of the first quantum signals and generation of the second quantum signals.

In another exemplary embodiment, as may be combined with the preceding paragraphs, the nondegenerate through quantum-limited amplifier comprises a fourth port, and the nondegenerate through quantum-limited amplifier is configured to amplify the second quantum signals, amplify and convert the frequencies of the first quantum signals to frequencies within the second frequency band, and output the amplified second quantum signals and the amplified frequency-converted first quantum signals from the fourth port.

Advantageously, the information content of the amplified quantum signals output from the third port of the nondegenerate through quantum-limited amplifier is the same as the information content of the amplified quantum signals output from the fourth port the nondegenerate through quantum-limited amplifier. This allows either the third port or the fourth port of the nondegenerate through quantum-limited amplifier to be coupled to a downstream signal processing path for further processing of the amplified quantum signals, depending on the desired frequency band of operation (e.g., the first frequency band or the second frequency band) that is compatible with the downstream signal processing path.

Another exemplary embodiment includes a system which comprises a first quantum array, a second quantum array, and a nondegenerate through quantum-limited amplifier. The first quantum array comprises first quantum bits, first readout resonators coupled to respective ones of the first quantum bits, and a first communication bus coupled to the first readout resonators. The first readout resonators are configured generate first readout signals which correspond to quantum states of the first quantum bits, and output the first readout signals on the first communication bus. The first readout signals comprise frequencies within a first frequency band. The second quantum array comprises second quantum bits, second readout resonators coupled to respective ones of the second quantum bits, and a second communication bus coupled to the second readout resonators. The second readout resonators are configured generate second readout signals which correspond to quantum states of the second quantum bits, and output the second readout signals on the second communication bus. The second readout signals comprise frequencies within a second frequency band. The nondegenerate through quantum-limited amplifier comprises a first port, a second port, and a third port. The first port is coupled to the first communication bus and configured to receive the first readout signals. The second port is coupled to the second communication bus and configured to receive the second readout signals. The nondegenerate through quantum-limited amplifier is configured to amplify the first readout signals, amplify and convert the frequencies of the second readout signals to frequencies within the first frequency band, and output the amplified first readout signals and the amplified frequency-converted second readout signals from the third port.

Another exemplary embodiment includes a system which comprises a first quantum bit, a first readout resonator coupled to the first quantum bit, a second quantum bit, a second readout resonator coupled to the second quantum bit, and a nondegenerate through quantum-limited amplifier comprising a first port, a second port, a third port, and a fourth port. The first port is coupled to the first readout resonator. The second port is coupled to the second readout resonator. The nondegenerate through quantum-limited amplifier is configured to amplify quantum noise on the third port and quantum noise on the fourth port to generate a first two-mode squeezed vacuum signal on the first port which is applied to the first readout resonator, and generate a second two-mode squeezed vacuum signal on the second port which is applied to the second readout resonator. The first two-mode squeezed vacuum signal and the second two-mode squeezed vacuum signal facilitate an entanglement operation between the first quantum bit and the second quantum bit.

In another exemplary embodiment, as may be combined with the preceding paragraphs, the nondegenerate through quantum-limited amplifier comprises a first nondegenerate three-wave mixing device, and a second nondegenerate three-wave mixing device. The first nondegenerate three-wave mixing device and the second nondegenerate three-wave mixing device are coupled in parallel.

In another exemplary embodiment, as may be combined with the preceding paragraphs, the first nondegenerate three-wave mixing device comprises a first mode input port, a second mode input port, and a common mode input port. The second nondegenerate three-wave mixing device comprises a first mode input port, a second mode input port, and a common mode input port. The first mode input ports are coupled through a first hybrid coupler. The second mode input ports are coupled through a second hybrid coupler. The common mode input ports are coupled through a third hybrid coupler.

In another exemplary embodiment, as may be combined with the preceding paragraphs, the first hybrid coupler comprises a 90 degree hybrid coupler, the second hybrid coupler comprises a 90 degree hybrid coupler, and the third hybrid coupler comprises a 180 degree hybrid coupler.

In another exemplary embodiment, as may be combined with the preceding paragraphs, the first nondegenerate three-wave mixing device comprises a first Josephson parametric converter amplifier, and the second nondegenerate three-wave mixing device comprises a second Josephson parametric converter amplifier.

Other embodiments will be described in the following detailed description of exemplary embodiments, which is to be read in conjunction with the accompanying figures.

DETAILED DESCRIPTION

Figure 1:
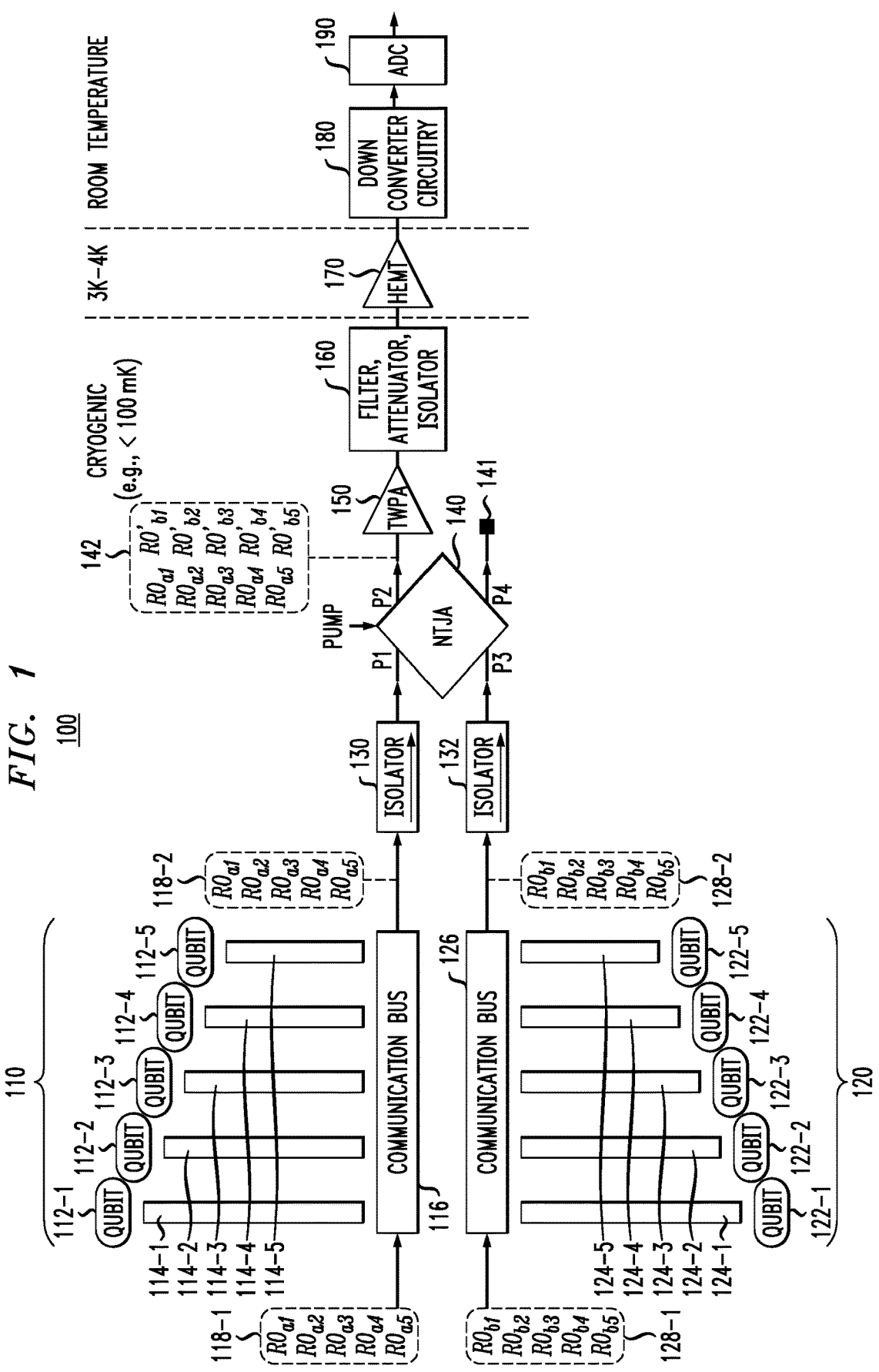
FIG. 1 schematically illustrates a frequency-multiplexed readout system for reading quantum states of superconducting qubits, according to an exemplary embodiment of the disclosure.

Exemplary embodiments of the disclosure will now be described in further detail with regard to nondegenerate through quantum-limited amplifiers (e.g., nondegenerate through Josephson amplifier) for quantum computing systems. In addition, exemplary embodiments of the disclosure include systems and methods for implementing frequency-multiplexed readout systems for reading the quantum states of superconducting qubits wherein the frequency-multiplexed readout systems utilize nondegenerate through quantum-limited amplifiers to increase a spectral density of amplified qubit readout signals per output line. Further, exemplary embodiments of the disclosure include systems and methods for utilizing nondegenerate through quantum-limited amplifiers to facilitate entanglement operations between remote superconducting qubits.

It is to be understood that the various features shown in the accompanying drawings are schematic illustrations that are not drawn to scale. Moreover, the same or similar reference numbers are used throughout the drawings to denote the same or similar features, elements, or structures, and thus, a detailed explanation of the same or similar features, elements, or structures will not be repeated for each of the drawings. Further, the term "exemplary" as used herein means "serving as an example, instance, or illustration." Any embodiment or design described herein as "exemplary" is not to be construed as preferred or advantageous over other embodiments or designs.

Further, it is to be understood that the phrase "configured to" as used in conjunction with a circuit, structure, element, component, or the like, performing one or more functions or otherwise providing some functionality, is intended to encompass embodiments wherein the circuit, structure, element, component, or the like, is implemented in hardware, software, and/or combinations thereof, and in implementations that comprise hardware, wherein the hardware may comprise quantum circuit elements (e.g., quantum bits, coupler circuitry, etc.), discrete circuit elements (e.g., transistors, inverters, etc.), programmable elements (e.g., application specific integrated circuit (ASIC) chips, field-programmable gate array (FPGA) chips, etc.), processing devices (e.g., central processing units (CPUs), graphics processing units (GPUs), etc.), one or more integrated circuits, and/or combinations thereof. Thus, by way of example only, when a circuit, structure, element, component, etc., is defined to be configured to provide a specific functionality, it is intended to cover, but not be limited to, embodiments where the circuit, structure, element, component, etc., is comprised of elements, processing devices, and/or integrated circuits that enable it to perform the specific functionality when in an operational state (e.g., connected or otherwise deployed in a system, powered on, receiving an input, and/or producing an output), as well as cover embodiments when the circuit, structure, element, component, etc., is in a non-operational state (e.g., not connected nor otherwise deployed in a system, not powered on, not receiving an input, and/or not producing an output) or in a partial operational state.

As is known in the art, quantum computing provides a computing paradigm which utilizes fundamental principles of quantum mechanics to perform computations. Quantum computing algorithms and applications are defined using quantum circuits. A quantum circuit is a computational routine which defines coherent quantum operations that are performed on quantum data that is stored in quantum bits, in conjunction with operations that are performed using classical computation. Quantum circuits are utilized to define complex algorithms and applications in an abstract manner, which can be executed on a quantum computer. In a quantum computer, primitive operations comprise gate operations (e.g., single-qubit gate operations, two-qubit gate operations, multi-qubit gate operations (e.g., 3 or more qubits) that are applied to qubits, to perform quantum computing operations for a given application. The quantum circuits allow a quantum computer to receive classical data, perform quantum operations based on the received data, and output a classical solution.

A single qubit can have a basis state of $|0\rangle$ (ground state) or $|1\rangle$ (first excited state), or a linear combination of such basis states, which is known as a superposition state. The state of a given qubit can be changed by applying a single-qubit gate operation to the given qubit. In addition, qubits can be controlled using entanglement gate operations to entangle the states of two or more qubits and, thereby, generate a combined state of two or more qubits, which contains more information than the individual states of the qubits. In this regard, quantum computing based on qubits operates on two key principles of quantum physics: superposition and entanglement, wherein superposition essentially allows a given qubit to represent both a 1 and a 0 at the same time, and wherein entanglement allows multiple qubits in a superposition to be correlated with each other in a way that the state of one qubit can depend on the state of another qubit such that more information can be encoded with multiple entangled qubits as compared to encoding the qubits individually. Accordingly, quantum information processing, based on principles of superposition and entanglement state of qubits, allows quantum computers to solve difficult problems that are intractable using conventional computers.

As noted above, a frequency-multiplexed readout system (which implements frequency domain multiplexing) can be utilized to scale-up a readout chain in a quantum computing system for reading the quantum states of superconducting qubits in relatively large superconducting quantum computers. In a frequency-multiplexed readout system, multiple readout resonators (with different resonance frequencies) are coupled to separate qubits and commonly coupled to a communication bus. The communication bus is configured to allow the transmission of multiple readout signals with readout frequencies which match the resonance frequencies of the readout resonators, and, thus simultaneously read out the quantum states of multiple qubits using one input and one output line.

In this regard, a frequency domain multiplexing scheme for qubit readout can provide a significant reduction in the number of input and output lines and the amount of hardware, which needs to be implemented in a dilution refrigeration system to enable the readout of states of multiple qubits. In addition, such a scalable scheme is enabled by the availability of, e.g., (i) high-electron-mobility-transistor (HEMT) amplifiers that have sufficient gain, bandwidth, and saturation power, etc., to support the readout of multiple readout signals simultaneously, (ii) wideband and high saturation power quantum-limited amplifiers (QLAs) such as a Josephson traveling wave parametric amplifier (JTWPA), (iii) wideband isolators and circulators, (iv) wideband filters and attenuators, and (v) a downconverter system and analog-to-digital (ADC), which are capable of down converting the readout signals to low intermediate frequency (IF) signals on the order of tens of megahertz, and sampling (digitizing) the IF signals to be processed by a computer, for multiple microwave frequencies with narrow frequency spacing propagating on the same transmission line using state-of-the-art room-temperature electronics.

As noted above, one main constraint for a frequency-multiplexed readout system is the minimum frequency spacing which is needed between the resonant frequencies of the readout resonators (which are commonly coupled to a single communication bus) to maintain an amount of crosstalk between the readout resonators below a certain threshold. The minimum frequency spacing that is needed to minimize crosstalk between readout resonators places a constraint on a "frequency domain multiplexing ratio" which corresponds to the maximum number of readout signals that can be carried by one pair of input and output lines for a given operating bandwidth of the readout signal path (e.g., operating bandwidth of a QLA in the readout signal path). The minimum frequency spacing is influenced by a trade-off between increasing the multiplexing ratio (by decreasing the spacing between the resonant frequencies of the readout resonators) and decreasing the crosstalk (by increasing a ratio of frequency spacing to readout resonator bandwidth).

However, the bandwidths of the readout resonators cannot be arbitrary small. On the contrary, it is desirable for the readout resonators to have relatively large bandwidths to increase readout speed (this is assuming that the Purcell effect, which could potentially limit the coherence times (Ti) of the superconducting qubits due to such large bandwidths, is minimized by the integration of a Purcell filter into the readout bus using techniques known to those of ordinary skill in the art). Thus, with the bandwidths of the readout resonators being set to achieve a desired readout speed, the minimum frequency spacing of the readout resonators (denoted herein as $\Delta_{crosstalk}$) is primarily determined by the maximum tolerable crosstalk per readout bus. By way of example, assuming the readout resonators have bandwidths in the range of 2-5 MHz, the minimum frequency spacing of the readout resonators can be around 70 MHz. Further assuming that an effective bandwidth of a QLA in the readout signal path is 700 MHz, this results in a frequency domain multiplexing ratio of 700 MHz/70 MHz=10. Typically, depending on the given readout configuration, $\Delta_{crosstalk}$~70 MHz-100 MHz.

On the other hand, for the frequency-multiplexed readout system, the downconversion and sampling of the readout signals can be achieved for multiple readout signals with narrow frequency spacing (denoted, $\Delta_{downconversion}$) propagating on the same transmission line of the readout signal path. For example, depending on the given configuration of the downconversion and sampling circuitry, $\Delta_{downconversion}$~10 MHz-15 MHz. In this regard, since $\Delta_{crosstalk}$>>$\Delta_{downconversion}$, a frequency-multiplexed readout system having amplified readout signals with frequency spacing constrained by $\Delta_{crosstalk}$ translates to unused bandwidth per readout signal path. As explained in further detail below, exemplary embodiments of the disclosure include frequency-multiplexed readout systems that are configured to increase the spectral density of amplified readout signals per unit bandwidth per output line independent of the constraint $\Delta_{crosstalk}$.

For example, FIG. 1 schematically illustrates a frequency-multiplexed readout system for reading quantum states of superconducting qubits, according to an exemplary embodiment of the disclosure. In particular, FIG. 1 schematically illustrates a frequency-multiplexed readout system 100 comprising a first quantum array 110, a second quantum array 120, a first isolator 130, a second isolator 132, a nondegenerate through Josephson amplifier (NTJA) 140, a traveling wave parametric amplifier (TWPA) 150, filter, attenuator, and isolator components 160, a high-electron-mobility transistor (HEMT) amplifier 170, downconverter circuitry 180, and an analog-to-digital converter (ADC) 190, the functions of which will be explained in further detail below. The first quantum array 110 comprises a plurality of superconducting qubits 112-1, 112-2, 112-3, 112-4, and 112-5 (generally, superconducting qubits 112), a plurality of readout resonators 114-1, 114-2, 114-3, 114-4, and 114-5 (generally readout resonators 114), and a communication bus 116. The second quantum array 120 comprises a plurality of superconducting qubits 122-1, 122-2, 122-3, 122-4, and 122-5 (generally, superconducting qubits 122), a plurality of readout resonators 124-1, 124-2, 124-3, 124-4, and 124-5 (generally, readout resonators 124), and a communication bus 126.

FIG. 1 schematically illustrates an exemplary output chain (or readout chain) of microwave components of the frequency-multiplexed readout system 100, which is configured to readout (e.g., concurrently) the quantum states of the superconducting qubits 112 and 122 and combine multiple qubit readout signals of the superconducting qubits 112 and 122 into a single output line having an increased spectral density of qubit readout signals on the single output line, using techniques as will be explained in further detail below. As schematically illustrated in FIG. 1, in some embodiments, the exemplary output chain of microwave components of the frequency-multiplexed readout system 100 extends through different temperature stages (e.g., five temperature stages: 20 millikelvin (mK), 100 mK, 1K, 3-4K, 40K) of a dilution refrigeration system and out to a room temperature environment. For example, in some embodiments, the first and second quantum arrays 110 and 120, the first and second isolators 130 and 132, the NTJA 140, the TWPA 150, and the filter, attenuator, and isolator components 160 are maintained in cryogenic environments at temperatures less than 100 a millikelvin (mK), while other components (e.g., HEMT amplifier 170) are maintained in very low temperature environments of 3K-4K. On the other hand, the downconverter circuitry 180 and ADC 190 can be maintained in a room temperature environment outside the dilution refrigeration system.

In some embodiments, the first and second quantum arrays 110 and 120 reside in a base-temperature stage (e.g., 20 mK) and high vacuum environment of a dilution refrigeration system. In some embodiments, the first quantum array 110 and the second quantum array reside on a same quantum processor chip, while in other embodiments, the first quantum array 110 and the second quantum array 120 reside on different quantum processor chips which may be vertically stacked and coupled together, via indium bump bonds, using known structures and fabrication techniques. The superconducting qubits 112 and 122 of the first and second quantum arrays 110 and 120 comprise any type of superconducting qubits including, but not limited to, superconducting transmon qubits, fluxonium qubits, superconducting multimode qubits (e.g., superconducting tunable coupler qubits), etc.

The superconducting qubits 112 comprise respective qubit transition frequencies (e.g., on the order of GHz) which can be the same or detuned (i.e., transition frequencies that are close but separated by, e.g., 100 MHz or 200 MHz, etc.), depending on the particular implementation scheme of the qubit array and quantum processor. Similarly, the superconducting qubits 122 comprise respective qubit transition frequencies (e.g., on the order of GHz) which can be the same or detuned, depending on the particular implementation scheme of the qubit array and quantum processor. The transition frequency (alternatively, resonant frequency) of a superconducting qubit is the frequency that corresponds to a difference in the energy between the ground state $|0\rangle$ and the first excited state $|1\rangle$ of the qubit. With superconducting qubits, while higher energy levels are available for a given qubit (e.g., $|2\rangle$, $|3\rangle$, etc.), the quantum system is designed to isolate the two lowest energy levels (i.e., ground state $|0\rangle$ and first excited state $|1\rangle$) of the superconducting qubits, and thereby utilize each superconducting qubit as a basic two-level system for quantum computation, while ignoring higher energy states. The superconducting qubits can be designed to have a relatively high anharmonic spectrum, in which the frequency separation between the computational states and the non-computational states, is relatively high, allowing efficient use of a superconducting qubit as a two-level quantum system. The term "anharmonicity" refers to a difference between (i) the frequency ($f_{01}$) to transition from the ground state $|0\rangle$ to the first excited state $|1\rangle$ and (ii) the frequency ($f_{12}$) to transition from first excited state $|1\rangle$ to the second excited state $|2\rangle$, of the qubit.

Although not specifically shown in FIG. 1, each of the superconducting qubits 112 and 122 is coupled (e.g., capacitively coupled) to a corresponding, dedicated qubit drive line. The qubit drive line that is coupled to a given superconducting qubit is configured to apply control signals (e.g., microwave control pulse signals) to independently change the state of the given superconducting qubit. For example, a microwave control pulse can be applied to the qubit drive line to perform a single-qubit gate operation on the superconducting qubit or otherwise modify the computational state of the superconducting qubit, as needed, when executing a quantum algorithm. As is known in the art, the state of a superconducting qubit can be changed by applying a microwave control signal (e.g., control pulse) with a center frequency equal to a transition frequency of the qubit, wherein the axis of rotation about a given axis of the Bloch sphere (e.g., X-axis, Y-axis, or any axis in the X-Y plane) and the amount (angle) of such rotation are based, respectively, on the phase of the microwave control signal, and the amplitude and duration of the microwave control signal.

Further, as schematically illustrated in FIG. 1, in the first quantum array 110, each superconducting qubit 112-1, 112-2, 112-3, 112-4, and 112-5 is coupled to a respective one of the readout resonators 114-1, 114-2, 114-3, 114-4, and 114-5. Similarly, in the second quantum array 120, each superconducting qubit 122-1, 122-2, 122-3, 122-4, and 122-5 is coupled to a respective one of the readout resonators 124-1, 124-2, 124-3, 124-4, and 124-5. In some embodiments, the readout resonators 114 and 124 comprise transmission line readout resonators (e.g., half-wavelength coplanar waveguide resonators), which are utilized to readout the quantum states of the respective superconducting qubits 112 and 122 using, e.g., dispersive readout systems and techniques, which are well-known to those of ordinary skill in the art.

In the first quantum array 110, the readout resonators 114-1, 114-2, 114-3, 114-4, and 114-5 are configured to have respective resonant frequencies $f_{a_1}$, $f_{a_2}$, $f_{a_3}$, $f_{a_4}$, and $f_{a_5}$, which are different in frequency (as schematically illustrated in FIG. 1 by the different lengths of the readout resonators 114-1, 114-2, 114-3, 114-4, and 114-5), and which are detuned from the respective transition frequencies of the superconducting qubits 112-1, 112-2, 112-3, 112-4, and 112-5 to enable dispersive readout of the qubit states. The readout resonators 114-1, 114-2, 114-3, 114-4, and 114-5 are coupled (e.g., capacitively coupled) to the first communication bus 116 (e.g., a planar transmission line). In an exemplary, non-limiting embodiment, the resonant frequencies $f_{a_1}$, $f_{a_2}$, $f_{a_3}$, $f_{a_4}$, and $f_{a_5}$ have a frequency separation $\Delta_{crosstalk}=100$ MHz, and fall within a first frequency band (denoted $f_{B1}$) having a center frequency (denoted $f_a$) of 7 GHz (e.g., $f_a=7$ GHz) and a first bandwidth BW1 (e.g., 600 MHz bandwidth ranging from 6.7 GHz to 7.3 GHz).

Similarly, in the second quantum array 120, the readout resonators 124-1, 124-2, 124-3, 124-4, and 124-5 are configured to have respective resonant frequencies $f_{b_1}$, $f_{b_2}$, $f_{b_3}$, $f_{b_4}$, and $f_{b_5}$, which are different in frequency (as schematically illustrated in FIG. 1 by the different lengths of the readout resonators 124-1, 124-2, 124-3, 124-4, and 124-5), and which are detuned from the respective transition frequencies of the superconducting qubits 122-1, 122-2, 122-3, 122-4, and 122-5 to enable dispersive readout of the qubit states. The readout resonators 124-1, 124-2, 124-3, 124-4, and 124-5 are coupled (e.g., capacitively coupled) to the second communication bus 126 (e.g., a planar transmission line). In an exemplary, non-limiting embodiment, the resonant frequencies $f_{b_1}$, $f_{b_2}$, $f_{b_3}$, $f_{b_4}$, and $f_{b_5}$ have a frequency separation $\Delta_{crosstalk}=100$ MHz, and fall within a second frequency band (denoted $f_{B2}$) having a center frequency (denoted $f_b$) of 10 GHz (e.g., $f_b=10$ GHz) and a second bandwidth BW2 (e.g., 600 MHz bandwidth ranging from 9.7 GHz to 10.3 GHz). In the illustrative embodiment, while BW1~BW2, the first and second frequency bands $f_{B1}$ and $f_{B2}$ are non-overlapping frequency bands.

In some embodiments, a dispersive readout operation for reading the quantum state of a given superconducting qubit which is coupled to a given readout resonator, is performed by applying an input readout signal (e.g., microwave pulse) to the given readout resonator, and detecting/processing the readout signal that is reflected out from the given readout resonator. For example, in some embodiments, the readout signal that is applied to the given readout resonator has a single frequency tone that is the same or similar to the resonant frequency of the readout resonator, a pulse envelope with a given pulse shape (e.g., gaussian pulse envelope), and given pulse duration. In the dispersive regime of qubit-resonator coupling, the input readout signal interacts with the given qubit/resonator system, and the resulting output readout signal which is reflected out from the given readout resonator comprises information (e.g., phase and/or amplitude) that is qubit-state dependent. For example, in some embodiments, the quantum state of the given qubit is determined by measuring a state-dependent phase shift of the reflected output readout signal. In some embodiments, the readout measurement scheme is configured to leave the qubit in the state it was measured, known as a quantum non-demolition (QND) measurement.

The exemplary frequency-multiplexed readout system 100 implements a frequency domain multiplexing scheme which allows the quantum states of multiple qubits to be readout simultaneously, or near simultaneously, wherein the readout signals that are output from multiple qubit/readout resonator systems of the first quantum array 110 and the second quantum array 120 are combined into one signal processing path (e.g., one output line) for measuring the quantum states of the superconducting qubits 112 and 122. For example, as schematically shown in FIG. 1, the quantum states of the superconducting qubits 112-1, 112-2, 112-3, 112-4, and 112-5 can be measured by concurrently applying multiple readout signals $RO_{a_1}$, $RO_{a_2}$, $RO_{a_3}$, $RO_{a_4}$, and $RO_{a_5}$ (collectively, input readout signals 118-1) to the first communication bus 116, wherein the readout signals $RO_{a_1}$, $RO_{a_2}$, $RO_{a_3}$, $RO_{a_4}$, and $RO_{a_5}$ have frequencies that correspond to the resonant frequencies $f_{a_1}$, $f_{a_2}$, $f_{a_3}$, $f_{a_4}$, and $f_{a_5}$ of the respective readout resonators 114-1, 114-2, 114-3, 114-4, and 114-5. The input readout signals 118-1 are applied to the respective readout resonators 114-1, 114-2, 114-3, 114-4, and 114-5 to generate respective readout signals $RO_{a_1}$, $RO_{a_2}$, $RO_{a_3}$, $RO_{a_4}$, and $RO_{a_5}$ (collectively, output readout signals 118-2) which are reflected out from the readout resonators 114 and coupled onto the first communication bus 116. The output readout signals 118-2 are the same as the input readout signals 118-1, except that the output readout signals 118-2 may or may not have amplitude dips and phase shifts, depending on the quantum states of the respective superconducting qubits 112-1, 112-2, 112-3, 112-4, and 112-5.

Similarly, the quantum states of the superconducting qubits 122-1, 122-2, 122-3, 122-4, and 122-5 can be measured by concurrently applying multiple readout signals $RO_{b_1}$, $RO_{b_2}$, $RO_{b_3}$, $RO_{b_4}$, and $RO_{b_5}$ (collectively, input readout signals 128-1) to the second communication bus 126, wherein the readout signals $RO_{b_1}$, $RO_{b_2}$, $RO_{b_3}$, $RO_{b_4}$, and $RO_{b_5}$ have frequencies that correspond to the resonant frequencies $f_{b_1}$, $f_{b_2}$, $f_{b_3}$, $f_{b_4}$, and $f_{b_5}$ of the respective readout resonators 124-1, 124-2, 124-3, 124-4, and 124-5. The input readout signals 128-1 are applied to the respective readout resonators 124-1, 124-2, 124-3, 124-4, and 124-5 to generate respective readout signals $RO_{b_1}$, $RO_{b_2}$, $RO_{b_3}$, $RO_{b_4}$, and $RO_{b_5}$ (collectively, output readout signals 128-2) which are reflected out from the readout resonators 124 and coupled onto the second communication bus 126. The output readout signals 128-2 are the same as the input readout signals 128-1, except that the output readout signals 128-2 may or may not have amplitude dips and phase shifts, depending on the quantum states of the respective superconducting qubits 122-1, 122-2, 1212-3, 122-4, and 122-5.

As schematically illustrated in FIG. 1, the nondegenerate through Josephson amplifier 140 is a reciprocal four-port device comprising ports P1, P2, P3, and P4, and a control input port that receives a control signal (denoted Pump) to control the operation of the nondegenerate through Josephson amplifier 140. As explained in further detail below, the Pump control signal comprises a strong coherent microwave tone which serves as an energy source for amplifying the different microwave signals falling within the bandwidth of the nondegenerate through Josephson amplifier 140, and for implementing mixing functions for frequency conversion of the signal modes (upconversion or downconversion). The first communication bus 116 is coupled to the port P1 of the nondegenerate through Josephson amplifier 140 through the first isolator 130. The second communication bus 126 is coupled to the port P3 of the nondegenerate through Josephson amplifier 140 through the second isolator 132. Further, in the exemplary configuration of FIG. 1, the port P2 of the nondegenerate through Josephson amplifier 140 is coupled to the input of the TWPA 150, and the port P4 is coupled to a 50 Ohm cold termination 141. The output readout signals 118-2 ($RO_{a_1}$, $RO_{a_2}$, $RO_{a_3}$, $RO_{a_4}$, and $RO_{a_5}$) are input to the port P1 of the nondegenerate through Josephson amplifier 140 through the first isolator 130. The output readout signals 128-2 ($RO_{b_1}$, $RO_{b_2}$, $RO_{b_3}$, $RO_{b_4}$, and $RO_{b_5}$) are input to the port P3 of the nondegenerate through Josephson amplifier 140 through the second isolator 132.

The first and second isolators 130 and 132 are two-port (non-reciprocal) devices that are utilized to shield the first and second quantum arrays 110 and 120 from excessive signal reflection and amplification of quantum noise in the opposite direction. In particular, the first isolator 130 is configured to ensure that all (or nearly all) of the power of the readout signals $RO_{a_1}$, $RO_{a_2}$, $RO_{a_3}$, $RO_{a_4}$, and $RO_{a_5}$ on the first communication bus 116 is delivered to the port P1 of the nondegenerate through Josephson amplifier 140, while absorbing and isolating any power coming from the port P1 of the nondegenerate through Josephson amplifier 140 to prevent perturbance of the first quantum array 110. Similarly, the second isolator 132 is configured to ensure that all (or nearly all) of the power of the readout signals $RO_{b1}$, $RO_{b_2}$, $RO_{b_3}$, $RO_{b_4}$, and $RO_{b_5}$ on the second communication bus 126 is delivered to the port P3 of the nondegenerate through Josephson amplifier 140, while absorbing and isolating any power coming from the port P3 of the nondegenerate through Josephson amplifier 140 to prevent perturbance of the second quantum array 120.

In general, the nondegenerate through Josephson amplifier 140 comprises a quantum-limited amplifier that is configured to operate in a transmission mode and a frequency conversion mode (with phase conjugation) to amplify and combine the output readout signals 118-2 and 128-2 (which are output from the first and second communication buses 116 and 126) into a single output signal path (or single output signal line) with an increased spectral density of the output readout signals for downstream processing on single output line. For example, as schematically shown in FIG. 1, the nondegenerate through Josephson amplifier 140 combines the readout signals $RO_{a_1}$, $RO_{a_2}$, $RO_{a_3}$, $RO_{a_4}$, and $RO_{a_5}$ (which are input to port P1) and the readout signals $RO_{b_1}$, $RO_{b_2}$, $RO_{b_3}$, $RO_{b_4}$, and $RO_{b_5}$ (which are input to port P3), and outputs amplified readout signals $RO_{a_1}$, $RO_{a_2}$, $RO_{a_3}$, $RO_{a_4}$, and $RO_{a_5}$ and $$RO'_{b_1}, RO'_{b_2}, RO'_{b_3}, RO'_{b_4}, \text{ and } RO'_{b_5}$$

(collectively referred to as amplified readout signals 142).

The amplified readout signals $RO_{a_1}$, $RO_{a_2}$, $RO_{a_3}$, $RO_{a_4}$, and $RO_{a_5}$ that are output from port P2 have the same frequencies as the respective readout signals $RO_{a_1}$, $RO_{a_2}$, $RO_{a_3}$, $RO_{a_4}$, and $RO_{a_5}$ that are input to port P1. For example, in the non-limiting illustrative embodiment as noted above, the readout signals $RO_{a_1}$, $RO_{a_2}$, $RO_{a_3}$, $RO_{a_4}$, and $RO_{a_5}$ have respective frequencies that fall within the first frequency band $f_{B1}$ having the center frequency $f_a$=7 GHz and the first bandwidth BW1 (e.g., 600 MHz bandwidth ranging from 6.7 GHz to 7.3 GHz). On the other hand, the amplified readout signals $RO_{b_1}'$, $RO_{b_2}'$, $RO_{b_3}'$, $RO_{b_4}'$, and $RO_{b_5}'$ that are output from port P2 are frequency-converted versions of the readout signals $RO_{b_1}$, $RO_{b_2}$, $RO_{b_3}$, $RO_{b_4}$, and $RO_{b_5}$ that are input to port P3, wherein the amplified readout signals $RO_{b_1}'$, $RO_{b_2}'$, $RO_{b_3}'$, $RO_{b_4}'$, and $RO_{b_5}'$ have frequencies that fall within the first frequency band $f_{B1}$ and bandwidth BW1 of the amplified readout signals $RO_{a_1}$, $RO_{a_2}$, $RO_{a_3}$, $RO_{a_4}$, and $RO_{a_5}$.

For example, in the non-limiting illustrative embodiment as noted above, while the readout signals $RO_{b_1}$, $RO_{b_2}$, $RO_{b_3}$, $RO_{b_4}$, and $RO_{b_5}$ which are input to port P3 of the nondegenerate through Josephson amplifier 140 have respective frequencies that fall within the second frequency band $f_{B2}$ having the center frequency $f_b$=10 GHz) and the second bandwidth BW2 (e.g., 600 MHz bandwidth ranging from 9.7 GHz to 10.3 GHz), the amplified readout signals $$RO'_{b_1}, RO'_{b_2}, RO'_{b_3}, RO'_{b_4}, \text{ and } RO'_{b_5}$$

that are output from port P2 have respective frequencies that fall within the first frequency band $f_{B1}$ and bandwidth BW1 of the amplified readout signals $RO_{a_1}$, $RO_{a_2}$, $RO_{a_3}$, $RO_{a_4}$, and $RO_{a_5}$. Furthermore, despite the frequency conversion, the amplified readout signals $$RO'_{b_1}, RO'_{b_2}, RO'_{b_3}, RO'_{b_4}, \text{ and } RO'_{b_5}$$

that are output from port P2 have the same information content as the respective readout signals $RO_{b_1}$, $RO_{b_2}$, $RO_{b_3}$, $RO_{b_4}$, and $RO_{b_5}$ that are input to port P3 of the nondegenerate through Josephson amplifier 140.

In this configuration, the amplified readout signals $$RO'_{b_1}, RO'_{b_2}, RO'_{b_3}, RO'_{b_4}, \text{ and } RO'_{b_5}$$

are combined with the amplified readout signals $RO_{a_1}$, $RO_{a_2}$, $RO_{a_3}$, $RO_{a_4}$, and $RO_{a_5}$ in the same readout signal path for subsequent processing by the TWPA 150, the filter, attenuator, and isolator components 160, the HEMT amplifier 170, the downconverter circuitry 180, and the ADC 190, wherein it is assumed that such system components 150, 160, 170, 180, and 190 are configured to further process the amplified readout signals 142 with respective frequencies that fall within the first frequency band frequency band $f_{B1}$ and bandwidth BW1. In this regard, the amplified readout signals 142 which are output from the nondegenerate through Josephson amplifier 140 have increased spectral density in the first frequency band $f_{B1}$, wherein the frequency separation between any of the amplified readout signals $$RO_{a_1}, RO_{a_2}, RO_{a_3}, RO_{a_4}, RO_{a_5}, RO'_{b_1}, RO'_{b_2}, RO'_{b_3}, RO'_{b_4}, \text{ and } RO'_{b_5}$$

is less than $\alpha_{crosstalk}$ but greater than $\Delta_{downconversion}$ for proper downconversion and sampling by the downconverter circuitry 180 and the ADC 190. The downconverter circuitry 180 comprises downconverting mixer circuitry which is configured to mix the readout signals with the proper local oscillator signals to downconvert the frequencies of the amplified readout signals $$RO_{a_1}, RO_{a_2}, RO_{a_3}, RO_{a_4}, RO_{a_5}, RO'_{b_1}, RO'_{b_2}, RO'_{b_3}, RO'_{b_4}, \text{ and } RO'_{b_5}$$

to lower frequencies (e.g., intermediate frequencies) which are sampled (digitized) by the ADC 190 for processing by a computing system to determine the quantum states of the superconducting qubits.

The nondegenerate through Josephson amplifier 140 and the TWPA 150 comprise quantum-limited amplifiers that are configured to amplify the extremely low power readout signals 118-2 and 128-2 that are output from the first and second quantum arrays 110 and 120. The use of quantum-limited amplifiers (e.g., NTJA 140 and TWPA 150) in the first-stage amplification in the output chain add only a minimum amount of noise that is required by quantum mechanics to the input signals, which equals the ambient quantum noise, i.e., a half of a photon at the signal frequency. This means that in an ideal case, the signal-to-noise ratio at the output of a quantum-limited amplifier is only degraded by a factor of two (since the added noise and input noise are equal). The NTJA 140 and TWPA 150 are each configured to achieve a sufficient gain factor which is enough to dilute the noise contribution of downstream amplifiers (e.g., the HEMT amplifier 170). The TWPA 150 is optimized for frequency-multiplexed qubit readout since it has a relatively high higher saturation power and relatively large instantaneous bandwidth.

Figure 2A:
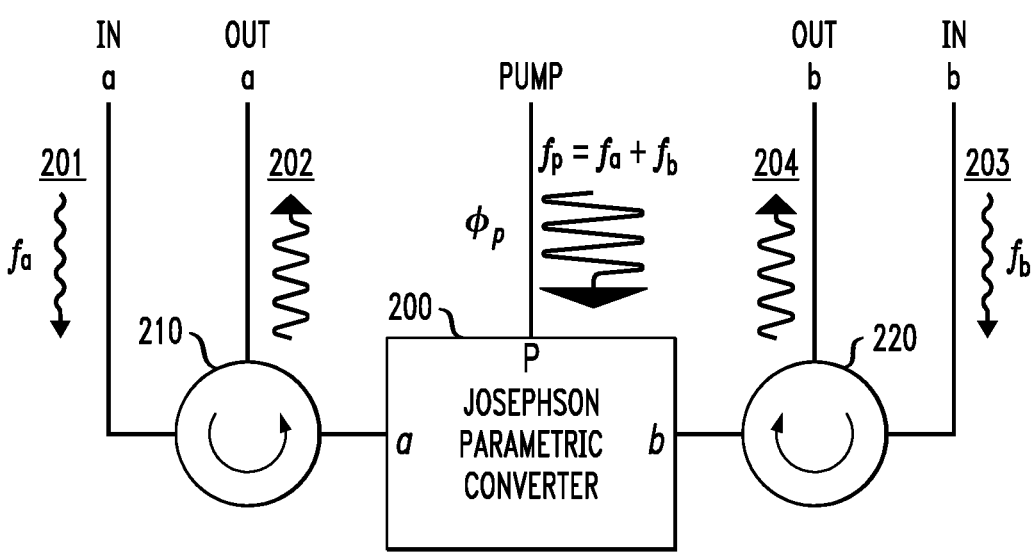
FIGS. 2A and 2B schematically illustrate exemplary embodiments and modes of operation of a Josephson parametric converter which is utilized as a building block for implementing a nondegenerate through Josephson amplifier, according to an exemplary embodiment of the disclosure.
Figure 2B:
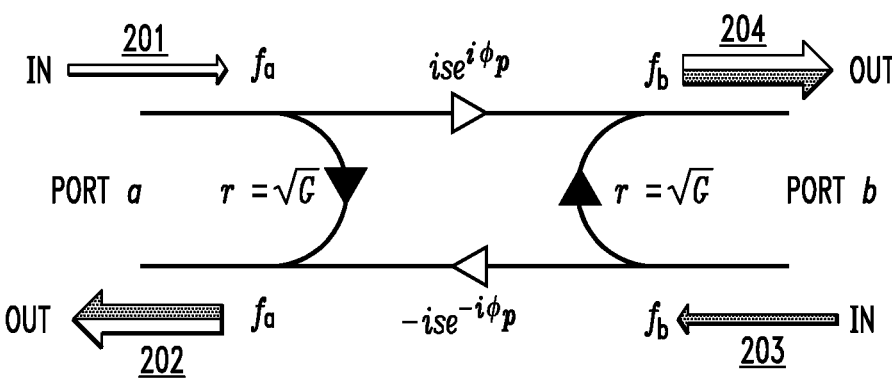
Figure 3:
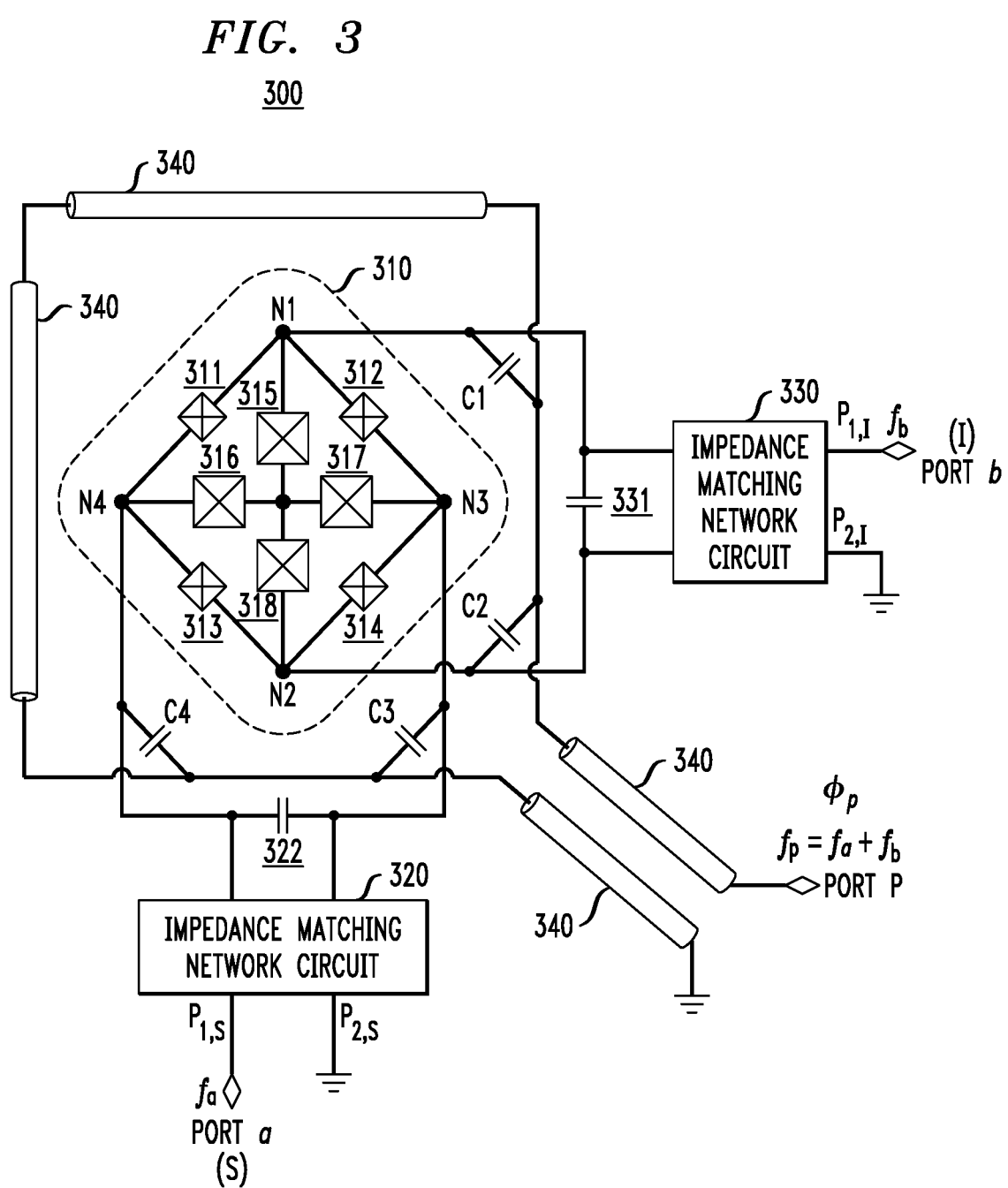
FIG. 3 schematically illustrates a superconducting nondegenerate three-wave mixing device which can be utilized to implement a nondegenerate through Josephson amplifier, according to an exemplary embodiment of the disclosure.

In some embodiments, the nondegenerate through Josephson amplifier 140 is implemented using a coupled pair of nondegenerate, three-wave mixing devices that are capable of amplifying and mixing weak microwave signals at the quantum limit. For example, in some embodiments, the nondegenerate, three-wave mixing devices are a Josephson parametric converter amplifier (which is alternatively referred to herein as a Josephson parametric converter, or a Josephson parametric amplifier). FIGS. 2A, 2B, and 3 schematically illustrate exemplary embodiments and modes of operation of a Josephson parametric converter amplifier which is utilized as a building block for implementing nondegenerate through Josephson amplifiers according to exemplary embodiments of the disclosure.

In particular, FIG. 2A schematically illustrates a Josephson parametric converter (JPC) amplifier 200 (or JPC device 200) which comprises three ports which are denoted Port a, Port b, and Port P. A first circulator 210 is coupled to Port a and a second circulator 220 is coupled to Port b. The first circulator 210 allows an input signal 201 with frequency $f_a$ to be input to Port a, and an output signal 202 to be output from Port a. Similarly, the second circulator 220 allows an input signal 203 with frequency $f_b$ to be input to Port b, and an output signal 204 to be output from Port b. The JPC device 200 operates as a quantum-limited amplifier having a (i) transmission process with gain to a different port with frequency conversion and phase conjugation (known as trans-gain process) and (ii) a reflection process with gain, i.e., reflection off the input port with gain, when a strong, coherent microwave drive signal, referred to as the "pump" signal is applied to Port P, where the pump signal has a frequency $f_p$ that is the sum of the frequencies of the input signals 201 and 203 applied to Port a and Port b, i.e., $f_p=f_a+f_b$, where those input signals fall within the bandwidths of the respective ports.

For example, FIG. 2B depicts an exemplary signal flow diagram of the JPC device 200. The input signal 201 with frequency $f_a$ is input to Port a, and the input signal 203 with frequency $f_b$ is input to Port b. The input signal 201 has information content that is represented by a non-shaded arrow, and the input signal 203 has information content that is represented by a shaded arrow. In reflection process, the input signal 201 is reflected back from Port a of the JPC device 200 with a reflection-amplitude gain $r=\sqrt{G}$, where G denotes a power gain of the input signal 201 in linear units. The reflection of the input signal 201 (from Port a) results in the output signal 202 (with frequency $f_a$) having the information content of the input signal 201 (as depicted by the non-shaded portion of the arrow that represents the output signal 202). Similarly, in reflection process, the input signal 203 is reflected back from Port b of the JPC device 200 with a reflection-amplitude gain $r=\sqrt{G}$, where G denotes a power gain of the input signal 203 in linear units. The reflection of the input signal 203 (from Port b) results in the output signal 204 (with frequency $f_b$) having the information content of the input signal 203 (as depicted by the shaded portion of the arrow that represents the output signal 204).

Next, in transmission process (i.e., trans-gain mode), the input signal 201 with frequency $f_a$ input to Port a is output from Port b with a frequency converted to $f_b$ and a transmission-amplitude gain of $s=\sqrt{G-1}$, where G denotes a power gain of the input signal 201 in linear units. The transmission of the input signal 201 from Port a to Port b results in the output signal 204 (with frequency $f_b$) having the information content of the input signal 201 (as depicted by the non-shaded portion of the arrow that represents the output signal 204). Similarly, in the transmission process, the input signal 203 with frequency $f_b$ input to Port b is output from Port a with a frequency converted to $f_a$ and amplified by a transmission-amplitude gain of $s=\sqrt{G-1}$, where G denotes a power gain of the input signal 203 in linear units. The transmission of the input signal 203 from Port b to Port a results in the output signal 202 (with frequency $f_a$) having the information content of the input signal 203 (as depicted by the shaded portion of the arrow that represents the output signal 202). The pump signal provides the energy for both amplification processes taking place in the JPC device 200.

In an exemplary embodiment, assuming G=100 (which corresponds to 20 dB of power gain), $r=\sqrt{100}$ and $s=\sqrt{99}$. In this instance, since $\sqrt{100}$ is approximately equal to $\sqrt{99}$, the reflection-amplitude gain r is close to the transmission-amplitude gain s. In this regard, the JPC device 200 operates as a lossless signal combiner which amplifies microwave signals that are input to Port a and Port b. In addition, as shown in FIG. 2B, the output signal 202 from Port a has a frequency $f_a$ and includes the information content of the input signals 201 and 203.

Next, FIG. 3 schematically illustrates a superconducting nondegenerate three-wave mixing device, according to an exemplary embodiment of the disclosure. In particular, FIG. 3 schematically illustrates a superconducting nondegenerate three-wave mixing device which comprises a Josephson parametric converter amplifier device 300 (or JPC device 300). The JPC device 300 comprises a Josephson ring modulator (JRM) 310, a first impedance matching network circuit 320, a second impedance matching network circuit 330, first and second capacitors 322 and 331, and a pump circuit 340. As explained in further detail below in conjunction with FIG. 4, in some embodiments, the JPC device 300 comprises a wideband Josephson parametric amplifier that is utilized to implement a nondegenerate through Josephson amplifier device according to an exemplary embodiment of the disclosure.

The JPC device 300 has three eigenmodes: two differential resonance modes and one common mode. The two differential resonance modes include a signal (S) resonant mode (or a mode), and an idler (I) resonant mode (or b mode). For example, in the exemplary embodiment shown in FIG. 3, in a nondegenerate embodiment, the JPC device 300 supports two differential resonance modes with different frequencies, e.g., a first frequency $f_a$ that is associated with the signal (S) mode, and a second frequency $f_b$ that is associated with the idler (I) mode. The pump signal is utilized to operate the JPC device 300 as an amplifier by applying a coherent non-resonant pump P signal ($f_P$) to a pump port (Port P) of the JPC device 300 at the sum frequency $f_P=f_a+f_b$. The pump P signal gives rise to a common mode excitation of the JRM 310 which leads to parametric amplification of the reflected signal and tones incident on the device ports Port a and Port b.

The JRM 310 is a nonlinear dispersive element that is configured to perform three-wave mixing of microwave signals at the quantum limit. The JRM 310 comprises four Josephson tunnel junctions 311, 312, 313, and 314 arranged in a Wheatstone bridge configuration which forms an outer loop with nodes N1, N2, N3, and N4. Further, in some embodiments, the JRM 310 comprises four shunting Josephson tunnel junctions 315, 316, 317, and 318, which are larger than the four Josephson tunnel junctions 311, 312, 313, and 314. The JRM 310 is configured to perform nondegenerate mixing in the microwave regime without losses, and can achieve quantum-limited noise performance both as an amplifier and a mixer.

The first capacitor 322 is coupled to the nodes N3 and N4 of the JRM 310, and the second capacitor 331 is coupled to the nodes N1 and N3 of the JRM 310. The center frequency of the resonant mode a (signal mode) is determined primarily by the first capacitor 322 coupled across the nodes N3 and N4 of the JRM 310, while the center frequency of the resonant mode b (idle mode) is determined primarily by the second capacitance coupled across the nodes N1 and N2 of the JRM 310. The first impedance matching network circuit 320 comprises a network of capacitors and inductors that is configured to tune/adjust (e.g., widen) the bandwidth of the resonant mode a, while the second impedance matching network circuit 330 comprises a network of capacitors and inductors that is configured to tune/adjust (e.g., widen) the bandwidth of the resonant mode b.

The JPC device 300 comprises two I/O signal ports $P_{1,s}$ and $P_{2,s}$ coupled to the first impedance matching network circuit 320, and two I/O idler ports $P_{1,s}$ and $P_{2,s}$ coupled to the second impedance matching network circuit 330. To implement single-ended I/O ports, e.g., a single Port a and a single Port b, without the use of 180 degree hybrid couplers, as schematically illustrated in FIG. 3, the I/O ports $P_{2,S}$ and $P_{2,I}$ are coupled to ground.

As further schematically shown in FIG. 3, the pump circuit 340 comprises one or more transmission lines which surround the JRM 310, and which are capacitively coupled to the nodes N1, N2, N3, and N4 of the JRM 310 via coupling capacitors C1, C2, C3, and C4. For the JRM 310 to operate as a three-wave mixing device, a direct current (DC) current circulating current in the outer loop of the JRM 310 is needed to facilitate the interaction between the three modes (S, I and P) of the JPC device 300. In an exemplary embodiment, the circulating DC current can be induced by applying a magnetic field (flux bias) through the outer loop of the JRM 310, which magnetic field is induced by the DC current applied to the pump circuit 340 which is wrapped around the JRM 310 to drive the JRM 310. One end of the pump circuit 340 provides the pump port (Port P), while the other end of the pump circuit 340 is be shorted to ground which could allow the flow of DC current through the pump circuit 340 to flux bias the JRM 310. Another way to flux bias the JRM 310 is by applying a magnetic field through a nearby flux line or external magnetic coil. Furthermore, in addition to flux biasing the device to implement an amplification mode of JPC device 300, a pump tone with a coherent frequency of $f_p=f_a+f_b$ is applied to the pump port (Port P). Again, the pump drive gives rise to a common mode excitation of the JRM 310 which leads to parametric amplification of reflected signals and tones incident on the device ports, Port a and Port b.

Figure 4:
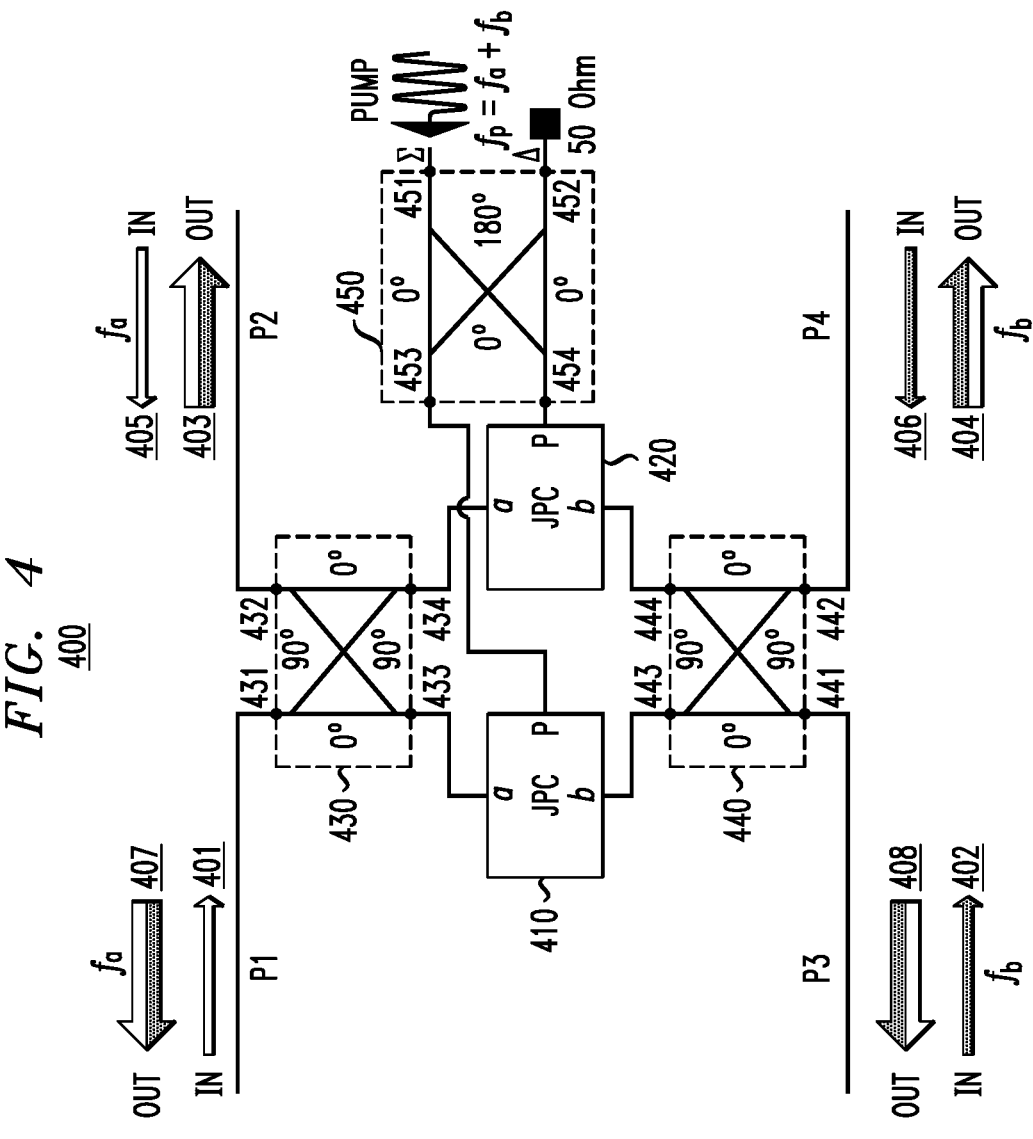
FIG. 4 schematically illustrates a nondegenerate through Josephson amplifier device, according to an exemplary embodiment of the disclosure.

As noted above, in some embodiments, the exemplary three-wave mixing devices shown in FIGS. 2A, 2B, and 3 are utilized to implement a nondegenerate through Josephson amplifier, such as the nondegenerate through Josephson amplifier 140 shown in FIG. 1. For example, FIG. 4 schematically illustrates a nondegenerate through Josephson amplifier 400, according to an exemplary embodiment of the disclosure. The nondegenerate through Josephson amplifier 400 comprises a first superconducting nondegenerate three-wave mixing device 410, a second superconducting nondegenerate three-wave mixing device 420, a first hybrid coupler 430, a second hybrid coupler 440, and a third hybrid coupler 450. In some embodiments, the first and second superconducting nondegenerate three-wave mixing devices 410 and 420 each comprise a Josephson parametric amplifier device (referred to hereafter as first JPC device 410 and second JPC device 420). In the exemplary configuration, the first and second hybrid couplers 430 and 440 each comprise a 90 degree hybrid coupler, and the third hybrid coupler 450 comprises a 180 degree hybrid coupler. The first and second JPC devices 410 and 420 have respective ports denoted Port a, Port b, and Port P. In some embodiments, the first and second JPC devices 410 and 420 are (nominally) identical.

The first and second JPC devices 410 and 420 are coupled together in parallel by the first and second hybrid couplers 430 and 440, thereby forming a four-port nondegenerate through Josephson amplifier device 400 comprising ports P1, P2, P3, and P4. In particular, as schematically shown in FIG. 4, the first hybrid coupler 430 comprises a first port 431, a second port 432, a third port 433, and a fourth port

434. The first and second ports 431 and 432 of the first hybrid coupler 430 are coupled to (or otherwise define) the respective ports P1 and P2 of the nondegenerate through Josephson amplifier device 400. The third port 433 of the first hybrid coupler 430 is coupled to Port a of the first JPC device 410, and the fourth port 434 of the first hybrid coupler 430 is coupled to Port a of the second JPC device 420. The second hybrid coupler 440 comprises a first port 441, a second port 442, a third port 443, and a fourth port 444. The first and second ports 441 and 442 of the second hybrid coupler 440 are coupled to (or otherwise define) the respective ports P3 and P4 of the nondegenerate through Josephson amplifier device 400. The third port 443 of the second hybrid coupler 440 is coupled to Port b of the first JPC device 410, and the fourth port 444 of the second hybrid coupler 440 is coupled to Port b of the second JPC device 420.

As further shown in FIG. 4, the third hybrid coupler 450 comprises a first port 451, a second port 452, a third port 453, and a fourth port 454. The first port 451 of the third hybrid coupler 450 is utilized as a control port to apply a Pump signal to the nondegenerate through Josephson amplifier device 400. The second port 452 of the third hybrid coupler 450 is coupled to a 50 Ohm termination. The third and fourth ports 453 and 454 of the third hybrid coupler 450 are coupled to the respective pump ports (Port P) of the first and second JPC devices 410 and 420. As noted above, in some embodiments, the third hybrid coupler 450 comprises a 180 degree hybrid coupler. In such embodiment, the third hybrid coupler 450 is configured to split the input Pump signal, which is applied to the first port 451 (i.e., the Σ port or 0 degree port), into two equal-amplitude, in-phase output signals (which are also in-phase with the input Pump signal) that are applied to the pump ports (Port P) of the first and second JPC devices 410 and 420. In other words, the third hybrid coupler 450 is configured to equally split the power of the input Pump signal into two equal-amplitude pump signals which are in-phase with the input Pump signal, and which are concurrently applied to the pump ports of the first and second JPC devices 410 and 420.

FIG. 4 schematically illustrates an exemplary mode of operation of the four-port nondegenerate through Josephson amplifier device 400, according to an exemplary embodiment of the disclosure. For example, FIG. 4 schematically depicts an input signal 401 which is input to port P1 and an input signal 402 which is input to port P3. The input signal 401 has a frequency $f_a$ and comprises information content that is depicted by a non-shaded arrow which schematically represents the input signal 401. The input signal 402 has a frequency $f_b$ and comprises information content that is depicted by a shaded arrow which schematically represents the input signal 402. In response to the input signals 401 and 402 (and a pump control signal with a pump frequency $f_p=f_a+f_b$), the nondegenerate through Josephson amplifier device 400 generates output signals 403 and 404 on the ports P2 and P4, respectively. The output signal 403 has the frequency $f_a$ of the input signal 401, and a combination of the information content of the input signals 401 and 402 as depicted by the non-shaded and shaded portions of an arrow which schematically represents the output signal 403. In addition, the output signal 404 has the frequency $f_b$ of the input signal 402, and a combination of the information content of the input signals 401 and 402 as depicted by the non-shaded and shaded portions of an arrow which schematically represents the output signal 404.

Since the four-port nondegenerate through Josephson amplifier device 400 is a reciprocal device, a similar through transmission and frequency conversation occurs with input signals applied the ports P2 and P4. For example, FIG. 4 schematically depicts an input signal 405 which is input to port P2 and an input signal 406 which is input to port P4. The input signal 405 has a frequency $f_a$ and comprises information content that is depicted by a non-shaded arrow which schematically represents the input signal 405. The input signal 406 has a frequency $f_b$ and comprises information content that is depicted by a shaded arrow which schematically represents the input signal 406. In response to the input signals 405 and 406 (and a pump control signal with a pump frequency $f_p=f_a+f_b$), the nondegenerate through Josephson amplifier device 400 generates output signals 407 and 408 on the ports P1 and P3, respectively. The output signal 407 has the frequency $f_a$ of the input signal 405, and a combination of the information content of the input signals 405 and 406 as depicted by the non-shaded and shaded portions of an arrow which schematically represents the output signal 407. In addition, the output signal 408 has the frequency $f_b$ of the input signal 406, and a combination of the information content of the input signals 405 and 406 as depicted by the non-shaded and shaded portions of an arrow which schematically represents the output signal 408.

The four-port nondegenerate through Josephson amplifier device 400 provides a quantum-limited amplifier that provides amplification and frequency conversion (up conversion/down conversion with phase conjugation) of an input signal. For example, a microwave signal entering port P1 at frequency $f_a$ is (i) transmitted to port P2 with amplification and without frequency conversion and (ii) transmitted to port P4 with amplification and with frequency conversion to $f_b$. Further, a microwave signal entering port P2 at frequency $f_a$ is (i) transmitted to port P1 with amplification and without frequency conversion and (ii) transmitted to port P3 with amplification and with frequency conversion to $f_b$. Similarly, a microwave signal entering port P3 at frequency $f_b$ is (i) transmitted to port P4 with amplification and without frequency conversion and (ii) transmitted to port P2 with amplification and with frequency conversion to $f_a$. Further, a microwave signal entering port P4 at frequency $f_b$ is (i) transmitted to port P3 with amplification and without frequency conversion and (ii) transmitted to port P1 with amplification and with frequency conversion to $f_a$.

In this regard, the exemplary nondegenerate through Josephson amplifier device 400 provides a reciprocal "through" amplifier architecture in that (i) an input signal applied to port P1 or port P3 is transmitted to port P2 and P4 with amplification (and with no reflection of the input signal from port P1 or port P3), and (ii) an input signal applied to port P2 or port P4 is transmitted to port P1 and P3 with amplification (and with no reflection of the input signal from port P2 or port P4). Indeed, as explained below, the nondegenerate through Josephson amplifier device 400 does not operate in a reflection mode, wherein the reflection coefficients $S_{11}=S_{22}=S_{33}=S_{44}=0$. In addition, the exemplary nondegenerate through Josephson amplifier device 400 is "nondegenerate" in the resonance modes and in the physical ports associated with those modes. In particular, the exemplary nondegenerate through Josephson amplifier device 400 is nondegenerate in mode frequency since the nondegenerate through Josephson amplifier device 400 is configured to operate with two distinct resonance modes a and b. In addition, the exemplary nondegenerate through Josephson amplifier device 400 is nondegenerate with respect to the physical ports since the JPC devices 410 and 420 have distinct ports a and b for the different modes, where the ports P1 and P2 are coupled to only the a ports of the JPC devices 410 and 420 via the first hybrid coupler 430, and the ports P3 and P4 are coupled to only the b ports of the JPC devices 410 and 420 via the second hybrid coupler 440.

Figure 5A:
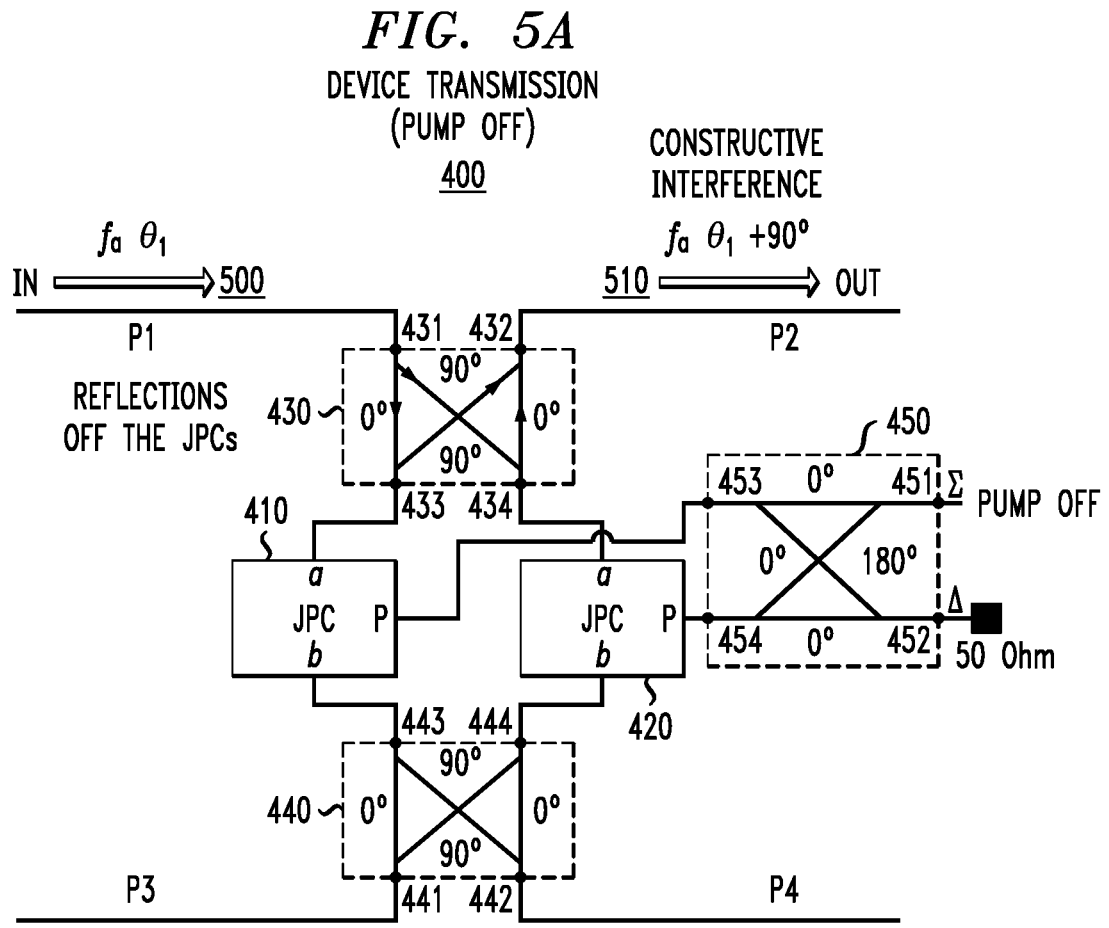
FIGS. 5A, 5B, and 5C schematically illustrate scattering parameters of a nondegenerate through Josephson amplifier device, according to exemplary embodiments of the disclosure.
Figure 5B:
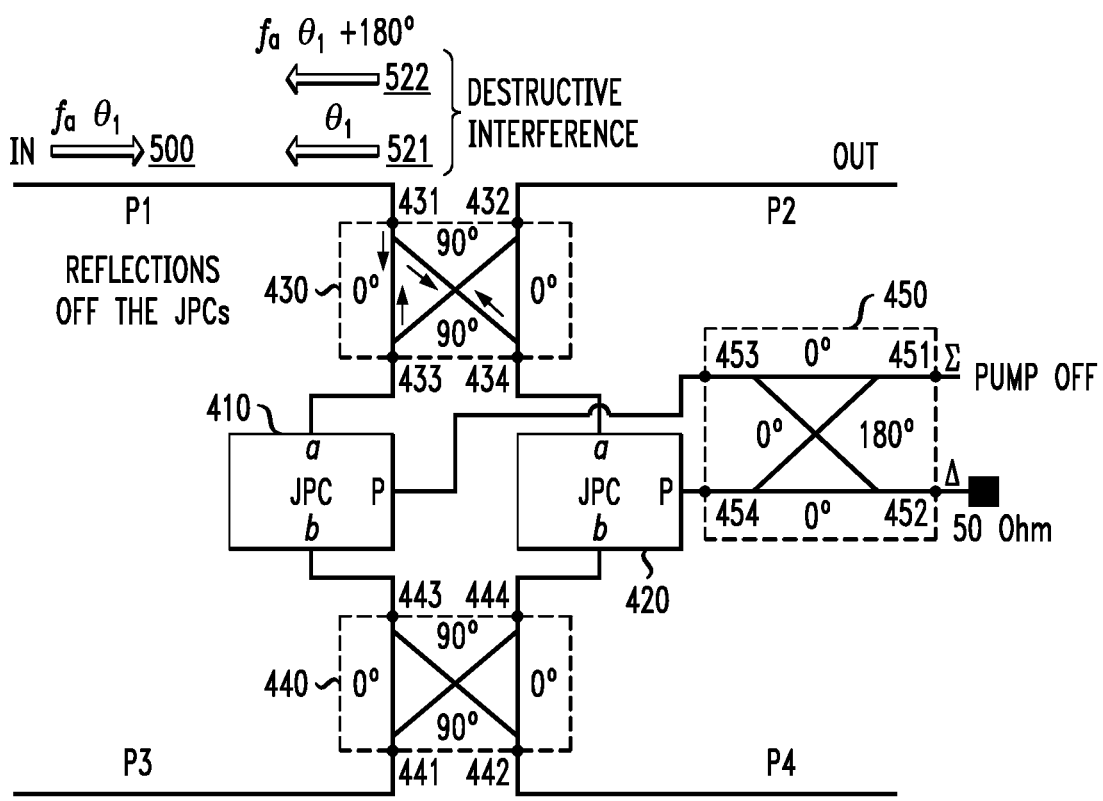
Figure 5C:
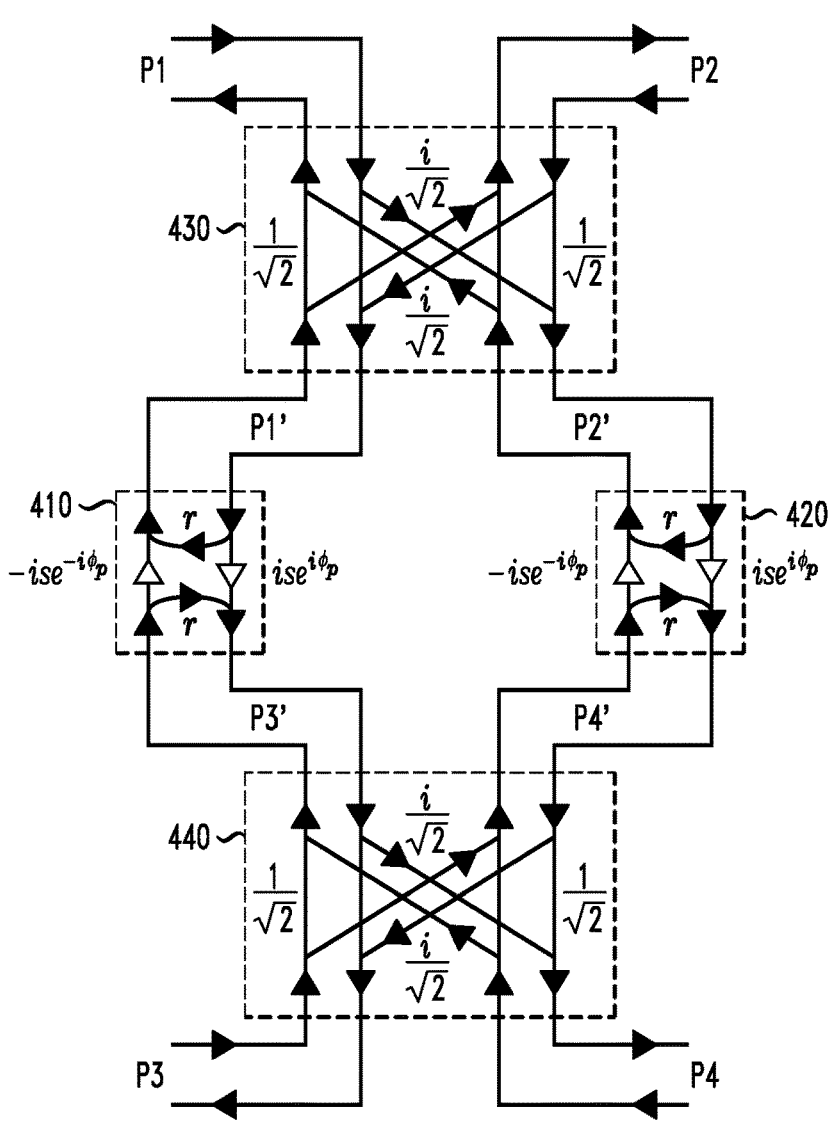

FIGS. 5A, 5B, and 5C schematically illustrate scattering parameters of the four-port nondegenerate through Josephson amplifier device 400 under operating conditions with the pump control off and with the pump control on. In particular, FIG. 5A schematically illustrates transmission characteristics of the four-port nondegenerate through Josephson amplifier device 400 in an off state (e.g., pump control off), according to an exemplary embodiment of the disclosure. For illustrative purposes, FIG. 5A schematically illustrates the transmission coefficient $S_{21}$ with regard to an input signal 500 input to port P1 and a resulting output signal 510 from port P2.

The input signal 500 comprises a frequency $f_a$ and phase $\theta_1$, and is applied to the first port 431 of the first hybrid coupler 430. As noted above, in some embodiments, the first hybrid coupler 430 is a 90 degree hybrid coupler, which has two output ports that are 90 degrees out of phase with each other, splitting power equally between its two output ports. The 90 degree hybrid coupler splits an input signal into two equal amplitude outputs, where one output is in-phase with the input signal, while the other output is 90 degree out-of-phase with the input signal.

More specifically, as shown in FIG. 5A, the input signal 500 is applied to the first port 431 of the first hybrid coupler 430, wherein the power of the input signal 500 is equally split into two signals, where a first signal propagates along a 0 degree leg (with no phase shift) from the first port 431 to the third port 433, and a second signal propagates along a 90 degree leg (with a 90 degree phase shift) from the first port 431 to the fourth port 434. The signal at the third port 433 is reflected by Port a of the first JPC device 410, and the reflected signal propagates along a 90 degree leg (with 90 degree phase shift) from the third port 433 to the second port 432. Further, the signal at the fourth port 434 is reflected by Port a of the second JPC device 420 and the reflected signal propagates along a 0 degree leg (with no phase shift) from the fourth port 434 to the second port 432. The two reflected signals at the second port 432 have the same phase (e.g., $\theta_1+90°$), and combine via constructive interference to generate the output signal 510 having the frequency $f_a$ of the input signal 500, but with phase shift of 90 degrees.

In this regard, in the off state (i.e., pump control off), the four-port nondegenerate through Josephson amplifier device 400 has a transmission coefficient $S_{21}=i$ (where $i=\sqrt{-1}$). Without further elaboration, it is to be noted that in the off state (i.e., pump control off), the four-port nondegenerate through Josephson amplifier device 400 has transmission coefficients $S_{21}=S_{12}=i$, $S_{34}=S_{43}=i$, $S_{31}=S_{13}=S_{41}=S_{14}=0$, and $S_{32}=S_{23}=S_{42}=S_{24}=0$.

Next, FIG. 5B illustrates reflection characteristics of the four-port nondegenerate through Josephson amplifier device 400 in an off state (e.g., pump control off), according to an exemplary embodiment of the disclosure. For illustrative purposes, FIG. 5B schematically illustrates the reflection coefficient $S_{11}$ with regard to the input signal 500 applied to P1 and resulting reflected signals 521 and 522 reflected out to port P1. Similar to FIG. 5A, the input signal 500 comprises a frequency $f_a$ and phase $\theta_1$, and is applied to the first port 431 of the first hybrid coupler 430. The first hybrid coupler 430 (90 degree hybrid coupler) equally divides the power of the input signal 500 into two signals, where a first signal propagates along the 0 degree leg (with no phase shift) from the first port 431 to the third port 433, and a second signal propagates along the 90 degree leg (with a 90 degree phase shift) from the first port 431 to the fourth port 434.

The signal at the third port 433 is reflected by Port a of the first JPC device 410, and the reflected signal propagates back along the 0 degree leg (with no phase shift) from the third port 433 to the first port 431, and is output as a reflected signal 521 with frequency $f_a$ and phase $\theta_1$. Further, the signal at the fourth port 434 is reflected by Port a of the second JPC device 420 and the reflected signal propagates back along the 90 degree leg (with an additional 90 degree phase shift) from the fourth port 434 to the first port 431, and is output as a reflected signal 522 with frequency $f_a$ and a phase $\theta_1+180°$. The two reflected signals at the first port 431 have the same frequency, but have a phase difference of 180 degrees. As such, the reflected signals 521 and 522 cancel each other as a result of destructive interference.

In this regard, in the off state (i.e., pump control off), the four-port nondegenerate through Josephson amplifier device 400 has a reflection coefficient $S_{11}=0$. Without further elaboration, it is to be noted that in the off state (i.e., pump control off), the ports P2, P3, and P4 of the four-port nondegenerate through Josephson amplifier device 400 has reflection coefficients $S_{22}=S_{33}=S_{44}=0$. For completeness, FIG. 5B illustrates a scattering matrix S 530 which includes the transmission and reflection coefficients for all ports P1, P2, P3, and P4 of the four-port nondegenerate through Josephson amplifier device 400 in the off state (i.e., pump control off).

Next, FIG. 5C illustrates transmission and reflection characteristics of the four-port nondegenerate through Josephson amplifier device 400 in an on state (e.g., pump control on), according to an exemplary embodiment of the disclosure. FIG. 5C schematically illustrates various signal paths through the four-port nondegenerate through Josephson amplifier device 400, where each line represents a path that a signal can take through the device. For example, the input port P1 is associated with two lines: a first line representing a signal flowing into port P1 of the nondegenerate through Josephson amplifier device 400 and a second line representing a signal flowing out from port P1 of the nondegenerate through Josephson amplifier device 400. The lines in FIG. 5C are marked with arrows representing the direction of the wave flow associated with each line.

FIG. 5C schematically illustrates signal paths through the first and second JPC devices 410 and 420, and the first and second hybrid couplers 430 and 440 (90 degree couplers), as well as relevant variables associated with the effects of the device components on the signals that are input to the four-port nondegenerate through Josephson amplifier device 400. For example, the first and second hybrid couplers 430 and 440 are labeled with the reflection amplitudes and transmission amplitudes associated with each line. For example, in an exemplary embodiment where the first hybrid coupler 430 is a symmetric (3 dB) coupler, the transmission amplitudes for microwave signals (i) entering port P1 and exiting port P1', (ii) entering port P1' and exiting port P1, (iii) entering port P2 and exiting port P2', and (iv) entering port P2' and exiting port P2, are all equal to $$\frac{1}{\sqrt{2}}.$$

Similarly, the transmission amplitude for microwave signals (i) entering port P1 and exiting port P2', (ii) entering port P2' and exiting port P1, (iii) entering port P2 and exiting port P1', and (iv) entering port P1' and exiting port P2, are all equal to $$\frac{i}{\sqrt{2}}$$

where $i=\sqrt{-1}$. The same parameters apply for the second hybrid coupler 440.

The first JPC device 410 and the second JPC device 420 are each associated with a reflection gain amplitude and a transmission gain amplitude at the resonant frequency, which are denoted as r and s, respectively. The reflection and transmission gain amplitudes satisfy the relation $r^2-s^2=1$. The gain amplitudes are complex numbers, the absolute value squared of the gain amplitudes representing the actual gain a signal will experience when reflected by or transmitted through the first and second JPC devices 410 and 420. In some embodiments, such shown in FIG. 5C, the same r and s for both the first JPC device 410 and the second JPC device 420. For completeness, FIG. 5C illustrates a scattering matrix S 540 which includes the transmission and reflection coefficients for all ports P1, P2, P3, and P4 of the four-port nondegenerate through Josephson amplifier device 400 in the on state (i.e., pump control on).

Figure 6:
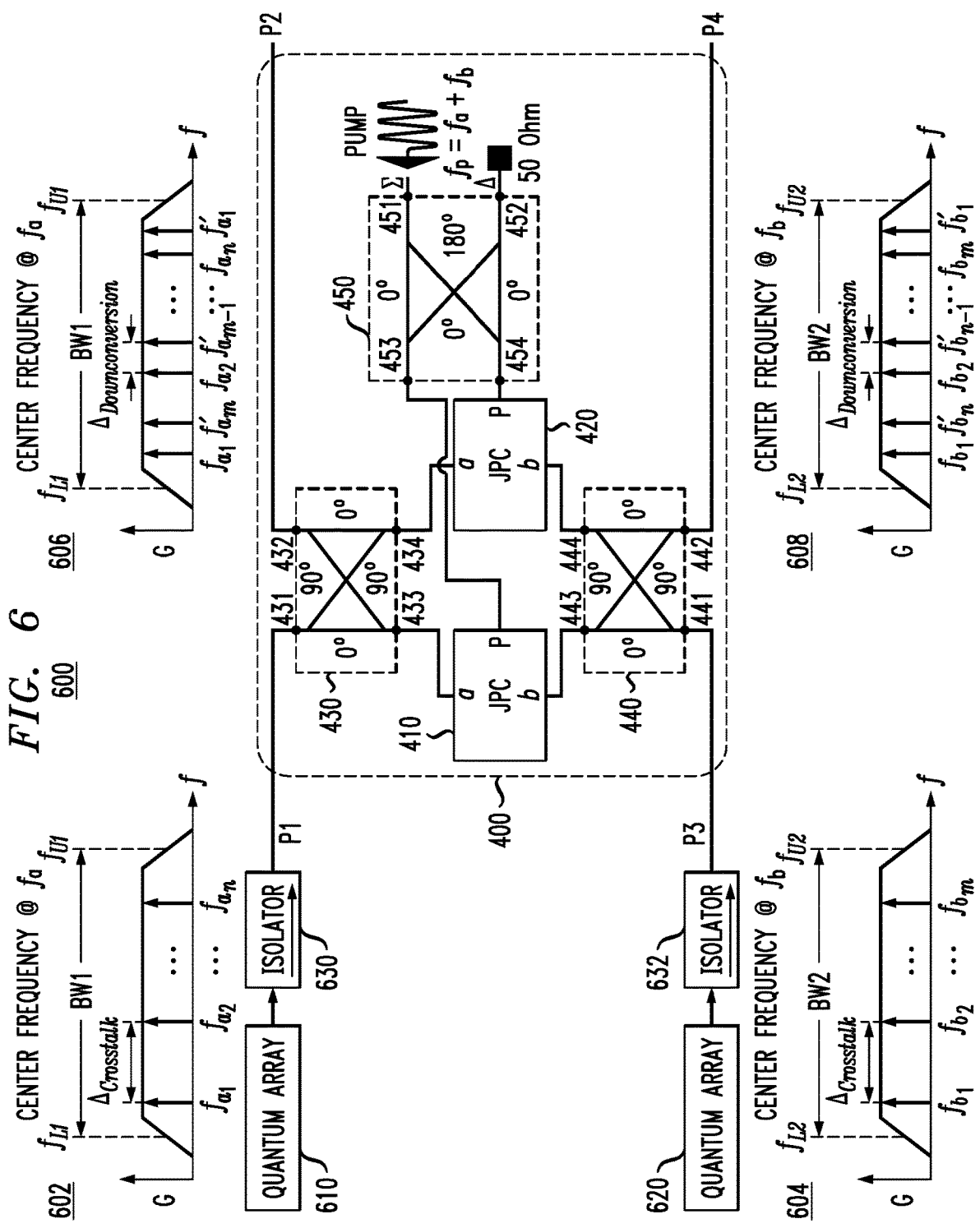
FIG. 6 schematically illustrates a frequency-multiplexed readout system for reading quantum states of superconducting qubits, according to another exemplary embodiment of the disclosure.

FIG. 6 schematically illustrates a frequency-multiplexed readout system for reading quantum states of superconducting qubits, according to another exemplary embodiment of the disclosure. In particular, FIG. 6 schematically illustrates a frequency-multiplexed readout system 600 comprising a first quantum array 610, a second quantum array 620, a first isolator 630, a second isolator 632, and a quantum-limited amplifier which is implemented using the exemplary architecture of the nondegenerate through Josephson amplifier 400 as discussed above. For ease of illustration and discussion, FIG. 6 omits various components in the readout signal path downstream of the nondegenerate through Josephson amplifier 400, such as the various components 150, 160, 170, 180, and 190, etc., as shown in FIG. 1.

The first quantum array 610 and the second quantum array 620 each comprise a plurality of superconducting qubits and associated readout resonators, such as described above in conjunction with FIG. 1. In the exemplary embodiment of FIG. 6, it is assumed that the first quantum array 610 comprises n readout resonators (and associated qubits), wherein the n readout resonators comprise respective resonance frequencies denoted $f_{a_1}$, $f_{a_2}$, . . . , $f_{a_n}$, where $f_{a_1}<f_{a_2}\leq$ . . . $<f_{a_n}$ (i=1, 2, . . . , n). In addition, it is assumed that the first quantum array 610 has a resonance frequency spacing constraint $\Delta_{crosstalk}$, where $|f_{a_{k+1}}-f_{a_k}|>\Delta_{crosstalk}$ (k=1, 2, . . . , n−1). Furthermore, it is assumed that the second quantum array 620 comprises m readout resonators (and associated qubits), wherein the m readout resonators comprise respective resonance frequencies denoted $f_{b_1}$, $f_{b_2}$, . . . , $f_{b_m}$, where $f_{b_1}<f_{b_2}<$ . . . $<f_{b_m}$ (j=1, 2, . . . , m). In addition, it is assumed that the second quantum array 620 has a resonance frequency spacing constraint $\Delta_{crosstalk}$, where $|f_{b_{l+1}}-f_{b_l}|>\Delta_{crosstalk}$ (l=1, 2, . . . , m−1).

FIG. 6 illustrates an exemplary frequency spectrum 602 of the n readout signals having center frequencies that correspond to the resonance frequencies $f_{a_1}$, $f_{a_2}$, . . . , $f_{a_n}$ of the readout resonators of the first quantum array 610. The frequency spectrum 602 comprises a first frequency band $f_{B1}$ defined by an upper frequency $f_{U1}$ and a lower frequency $f_{L1}$, and having a first bandwidth $BW1=f_{U1}-f_{L1}$ with a center frequency denoted as $f_a$. The resonance frequencies $f_{a_1}$, $f_{a_2}$, . . . , $f_{a_n}$ fall within the first frequency band $f_{B1}$ and are spaced apart by $\Delta_{crosstalk}$. The n readout signals from the first quantum array 610 are applied to port P1 of the nondegenerate through Josephson amplifier device 400.

Furthermore, FIG. 6 illustrates an exemplary frequency spectrum 604 of m readout signals having center frequencies that correspond to the resonance frequencies $f_{b_1}$, $f_{b_2}$, . . . , $f_{b_m}$ of the readout resonators of the second quantum array 620. The frequency spectrum 604 comprises a second frequency band $f_{B2}$ defined by an upper frequency $f_{U2}$ and a lower frequency $f_{b_1}$, $f_{L2}$, . . . , $f_{b_m}$ and having a second bandwidth $BW2=f_{U2}-f_{L2}$ with a center frequency denoted as $f_b$. The resonance frequencies $f_{b_1}$, $f_{b_2}$, . . . , $f_{b_m}$ fall within the second frequency band $f_{B2}$ and are spaced apart by $\Delta_{crosstalk}$. In an exemplary embodiment, the first and second frequency bands $f_{B1}$ and $f_{B2}$ are non-overlapping frequency bands. The m readout signals which are output from the second quantum array 620 are applied to port P3 of the nondegenerate through Josephson amplifier device 400.

FIG. 6 further illustrates an exemplary frequency spectrum of readout signals 606 which are output from port P2 of the nondegenerate through Josephson amplifier device 400 in response to the n readout signals (with center frequencies $f_{a_1}$, $f_{a_2}$, . . . , $f_{a_n}$) that are input to port P1 and the m readout signals (with center frequencies $f_{b_1}$, $f_{b_2}$, . . . , $f_{b_m}$) that are input to port P3 of the nondegenerate through Josephson amplifier device 400. The frequency spectrum of readout signals 606 output from port P2 includes the n readout signals (with center frequencies $f_{a_1}$, $f_{a_2}$, . . . , $f_{a_n}$), as well as additional output signals $$f_{a_1}^1, f_{a_2}', \dots, f_{a_m}' \text{ where } f_{a_j}' = f_p - f_{b_j}.$$

In this instance, the additional output signals $$f_{a_1}', f_{a_2}', \dots, f_{a_m}'$$

comprise frequency-converted versions of the original m readout signals (with center frequencies $f_{b_1}$, $f_{b_2}$, . . . , $f_{b_m}$) that are input to port P3 of the nondegenerate through Josephson amplifier device 400. The additional output signals $$f_{a_1}', f_{a_2}', \dots, f_{a_m}'$$

comprise frequencies that fall within the first frequency band $f_{B1}$ and satisfy a downconversion frequency separation constraint $\Delta_{downconversion}$ such that $$|f_{a_j}' - f_{a_i}| > \Delta_{downconverision},$$

for any i and j.

FIG. 6 further illustrates an exemplary frequency spectrum of readout signals 608 which are output from port P4 of the nondegenerate through Josephson amplifier device 400 in response to the n readout signals (with center frequencies $f_{a_1}$, $f_{a_2}$, . . . , $f_{a_n}$) that are input to port P1 and the m readout signals (with center frequencies $f_{b_1}$, $f_{b_2}$, . . . , $f_{b_m}$) that are input to port P3 of the nondegenerate through Josephson amplifier device 400. The frequency spectrum of readout signals 608 output from port P4 includes the m readout signals (with center frequencies $f_{b_1}$, $f_{b2}$, . . . , $f_{b_m}$), as well as additional output signals $$f'_{b_1}, f'_{b_2}, \dots , f'_{b_n} \text{ where } f'_{b_i} = f_p - f_{a_i}.$$

In this instance, the additional output signals $$f'_{b_1}, f'_{b_2}, \dots , f'_{b_n}$$

comprise frequency-converted versions of the original n readout signals (with center frequencies $f_{a_1}$, $f_{a_2}$, . . . , $f_{a_n}$) that are input to port P1 of the nondegenerate through Josephson amplifier device 400. The additional output signals $$f'_{b_1}, f'_{b_2}, \dots , f'_{b_n}$$

comprise frequencies that fall within the second frequency band $f_{B2}$ and satisfy a downconversion frequency separation constraint $\Delta_{downconversion}$ such that $$\left| f'_{a_j} - f_{a_i} \right| > \Delta_{downconverision},$$

for any i and j.

For illustrative purpose, a numerical example will now be discussed with respect to the process shown in FIG. 6 for increasing the spectral density of quantum microwave signals per readout channel. For example, assume that that the first frequency band $f_{B1}$ has a center frequency $f_a$=7 GHz, and the second frequency band $f_{B2}$ has a center frequency $f_b$=10 GHz. Assume further that the pump control signal Pump has a frequency of $f_p$=$f_a$+$f_b$=17 GHz. Assume further that resonance frequency separation constraint for the first and second quantum arrays 610 and 620 is $\Delta_{crosstalk}$=50 MHz, and that downconversion frequency separation constraint $\Delta_{downconversion}$=25 MHz. Assume further that BW1 and BW2 are approximately 550 MHz, the number of readout resonators for the first quantum array 610 is n=11, and that the number of readout resonators for the second quantum array 620 is m=10.

In view of the above parameters, assume that the resonance frequencies (in GHz) $f_{a_1}$, $f_{a_2}$, . . . , $f_{a_n}$ of the n=11 readout resonators for the first quantum array 610 are: 6.750, 6.800, 6.850, 6.900, 6.950, 7.000, 7.050, 7.100, 7.150, 7.200, 7.250, and that that the resonance frequencies (in GHz) $f_{b_1}$, $f_{b_2}$, . . . , $f_{b_m}$ of the m=10 readout resonators for the second quantum array 620 are: 9.775, 9.825, 9.875, 9.925, 9.750, 10.025, 10.075, 10.125, 10.175, 10.225. Assuming $$f'_{a_j} = f_p - f_{b_j},$$

the additional signals $$f'_{a_1}, f'_{a_2}, \dots , f'_{a_m}$$

(which are generated by frequency converting the readout signals with the frequencies $f_{b_1}$, $f_{b_2}$, . . . , $f_{b_m}$) are: 7.225, 7.175, 7.125, 7.075, 7.025, 6.975, 6.925, 6.875, 6.825, 6.775. In addition, assuming $$f'_{b_i} = f_p - f_{a_i},$$

the additional signals $$f'_{b_1}, f'_{b_2}, \dots , f'_{b_n}$$

(which are generated by frequency converting the readout signals with the frequencies $f_{a_1}$, $f_{a_2}$, . . . , $f_{a_n}$) are: 10.250, 10.200, 10.150, 10.100, 10.050, 10.000, 9.950, 9.900, 9.850, 9.800, 9.750. In this numerical example, the number of readout signals per channel is increased from 11 to 21.

Figure 7:
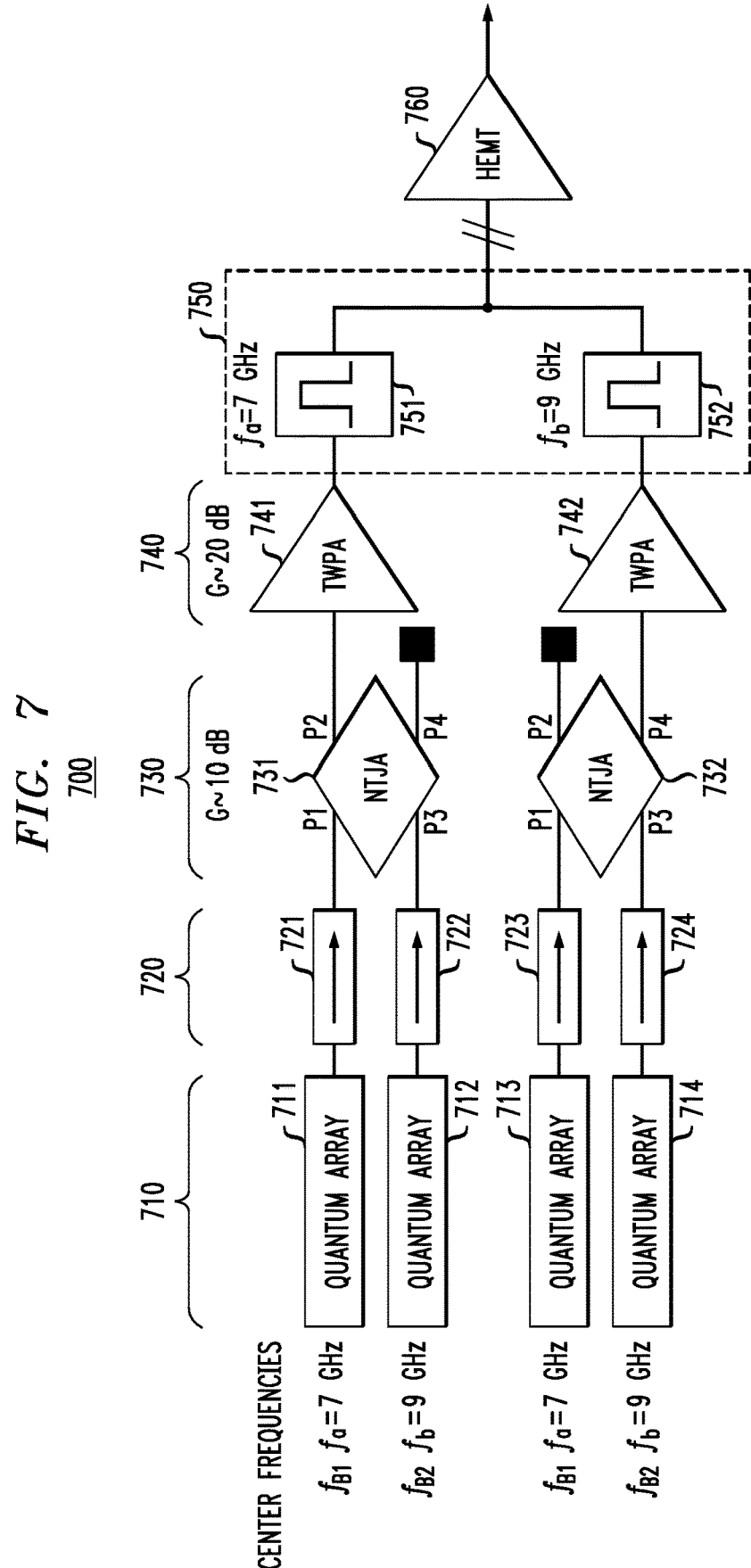
FIG. 7 schematically illustrates a frequency-multiplexed readout system for reading quantum states of superconducting qubits, according to another exemplary embodiment of the disclosure.

FIG. 6 illustrates an exemplary frequency-multiplexed readout system in which either the readout signals 606 from port P2 can be output to the downstream readout signal path by terminating port P4 of the nondegenerate through Josephson amplifier device 400, or the readout signals 608 from port P4 can be output to the downstream readout signal path by terminating port P2 of the nondegenerate through Josephson amplifier device 400. However, the illustrative embodiment of FIG. 6 can be further scaled using techniques as schematically illustrated in FIG. 7. For example, FIG. 7 schematically illustrates a frequency-multiplexed readout system 700 for reading quantum states of superconducting qubits, according to another exemplary embodiment of the disclosure. The frequency-multiplexed readout system 700 comprises a plurality of quantum arrays 710 (including first, second, third and fourth quantum arrays, 711, 712, 713, and 714), a plurality of isolators 720 (including first, second, third, and fourth isolators 721, 722, 723, and 724, a plurality of nondegenerate through Josephson amplifiers 730 (including first and second nondegenerate through Josephson amplifiers 731 and 732), a plurality of TWPAs 740 (including first and second TWPAs 741 and 742), a signal combiner 750, and a HEMT amplifier 760. The signal combiner 750 comprises a first bandpass filter 751 and a second bandpass filter 752, which are configured to have non-overlapping pass bands. For example, the first bandpass filter 751 has a center frequency of 7 GHz, and the second bandpass filter 751 has a center frequency of 9 GHz.

In an exemplary embodiment, the first quantum array 711 comprises a plurality of readout resonators (e.g., 10 readout resonators) and corresponding qubits in which the resonant frequencies of the readout resonators fall within a first frequency band $f_{B1}$ with a center frequency of 7 GHz. Similarly, the third quantum array 713 comprises a plurality of readout resonators (e.g., 10 readout resonators) and corresponding qubits in which the resonant frequencies of the readout resonators fall within the first frequency band $f_{B1}$ with the center frequency of 7 GHz. The second quantum array 712 comprises a plurality of readout resonators (e.g., 10 readout resonators) and corresponding qubits in which the resonant frequencies of the readout resonators fall within a second frequency band $f_{B2}$ with a center frequency of 9 GHz. Similarly, the fourth quantum array 714 comprises a plurality of readout resonators (e.g., 10 readout resonators) and corresponding qubits in which the resonant frequencies of the readout resonators fall within the second frequency band $f_{B2}$ with a center frequency of 9 GHz.

In some embodiments, the first and second nondegenerate through Josephson amplifier 731 and 732 are implemented using the four-port nondegenerate through Josephson amplifier architecture as shown in FIG. 4. In the exemplary configuration shown in FIG. 7, the port P4 of the first nondegenerate through Josephson amplifier 731 is terminated with a 50 Ohm termination, and the port P2 of the second nondegenerate through Josephson amplifier 732 is terminated with a 50 Ohm termination. The readout signals from the first quantum array 711 are input to port P1 of first nondegenerate through Josephson amplifier 731, and the readout signals from the second quantum array 712 are input to port P3 of first nondegenerate through Josephson amplifier 731. The first nondegenerate through Josephson amplifier 731 (i) amplifies and converts the frequencies of the readout signals input to port P3 into frequencies that fall within the first frequency band $f_{B1}$ (with the center frequency of 7 GHz) of the readout signal frequencies applied to port P1, and (ii) outputs the readout signals of the first and second quantum arrays 711 and 712 from port P2 with an increased spectral density of readout signals within the first frequency band $f_{B1}$.

Similarly, the readout signals from the third quantum array 713 are input to port P1 of second nondegenerate through Josephson amplifier 732, and the readout signals from the fourth quantum array 714 are input to port P3 of second nondegenerate through Josephson amplifier 732. The second nondegenerate through Josephson amplifier 732 (i) amplifies and converts the frequencies of the readout signals input to port P1 into frequencies that fall within the second frequency band $f_{B2}$ (with the center frequency of 9 GHz) of the readout signal frequencies applied to port P3, and (ii) outputs the readout signals of the third and fourth quantum arrays 713 and 714 from port P4 with an increased spectral density of readout signals within second frequency band $f_{B2}$.

The first TWPA 741 amplifies the readout signals from port P2 of the first nondegenerate through Josephson amplifier 731, and the second TWPA 742 amplifies the readout signals from port P4 of the second nondegenerate through Josephson amplifier 732. The first bandpass filter 751 filters the amplified readout signals that are output from the first TWPA 741, and the second bandpass filter 752 filters the amplified readout signals that are output from the second TWPA 742. The signal combiner 750 combines the filtered output signals from the first and second bandpass filters 751 and 752 into a single output line which feeds an input of the HEMT amplifier 760 downstream from the signal combiner 750. Assuming that there are approximately 10 qubits per quantum array, the frequency-multiplexed readout system 700 supports the concurrent readout of about 40 qubits per readout line.

It is to be appreciated that the utilization of nondegenerate through Josephson amplifier device to implement frequency-multiplexed qubit readout systems as described herein provide significant advantages over conventional qubit readout schemes. For example, in one conventional approach, a spectral density of readout signals per channel can be achieved by combining the output of two QLAs chains using a power combiner. The major disadvantage of this solution is that the power combiner introduces a 3 dB loss which significantly lowers the SNR and fidelity of the measurement. Another possible solution is to use a diplexer to combine readout signals falling within two different non-overlapping frequency bands into one common channel. One disadvantage of this solution is the added hardware. e.g., two QLAs and a diplexer are required as compared to using a single nondegenerate through QLA in the exemplary schemes discussed herein). Another disadvantage is that due to non-overlapping bandwidths of the diplexer, this conventional approach does not achieve a high density of readout signals per unit bandwidth (i.e., the added signals lie within a different frequency band).

As quantum computers scale up and grow in the number of qubits that are implemented by a quantum processor, modular architectures that connect multiple distant quantum chips will become increasingly important. To form a large quantum computer using smaller quantum processors, the qubits of the processors need to be entangled. One promising idea for generating deterministic remote entanglement relies on generating two-mode squeezing by a 3-wave mixing element such as the JPC, and applying the squeezed vacuum to two distant cQED (circuit Quantum Electrodynamics) systems that consist of a qubit coupled to a microwave resonator. According to this theoretical proposal, when the two-mode squeezed vacuum is combined with local drives applied to the two cQEDs, a Bell state (entanglement) is deterministically generated between the two remote qubits and stabilized.

One key disadvantage of this scheme is that its hardware requires using circulators to route in a directional manner the generated reflected two-mode squeezed vacuum from the 3-wave mixer ports (such as the JPC that works in reflection) to the cQEDs and back to cold 50 Ohm loads. However, including these circulators in the two-mode squeezed vacuum path introduces loss that can degrade the fidelity of the remote entanglement.

In accordance with an exemplary embodiment of the disclosure, a nondegenerate 3-wave mixer that works in transmission can be used to eliminate the need for circulators when implementing remote entanglement schemes that rely on the generation and distribution of two-mode squeezed vacuum. This will enable the realization of a powerful scheme for generating deterministic, fast, high-fidelity quantum entanglement between qubits residing on remote chips, which can be used to build large superconducting quantum computers using modular architectures.

Figure 8:
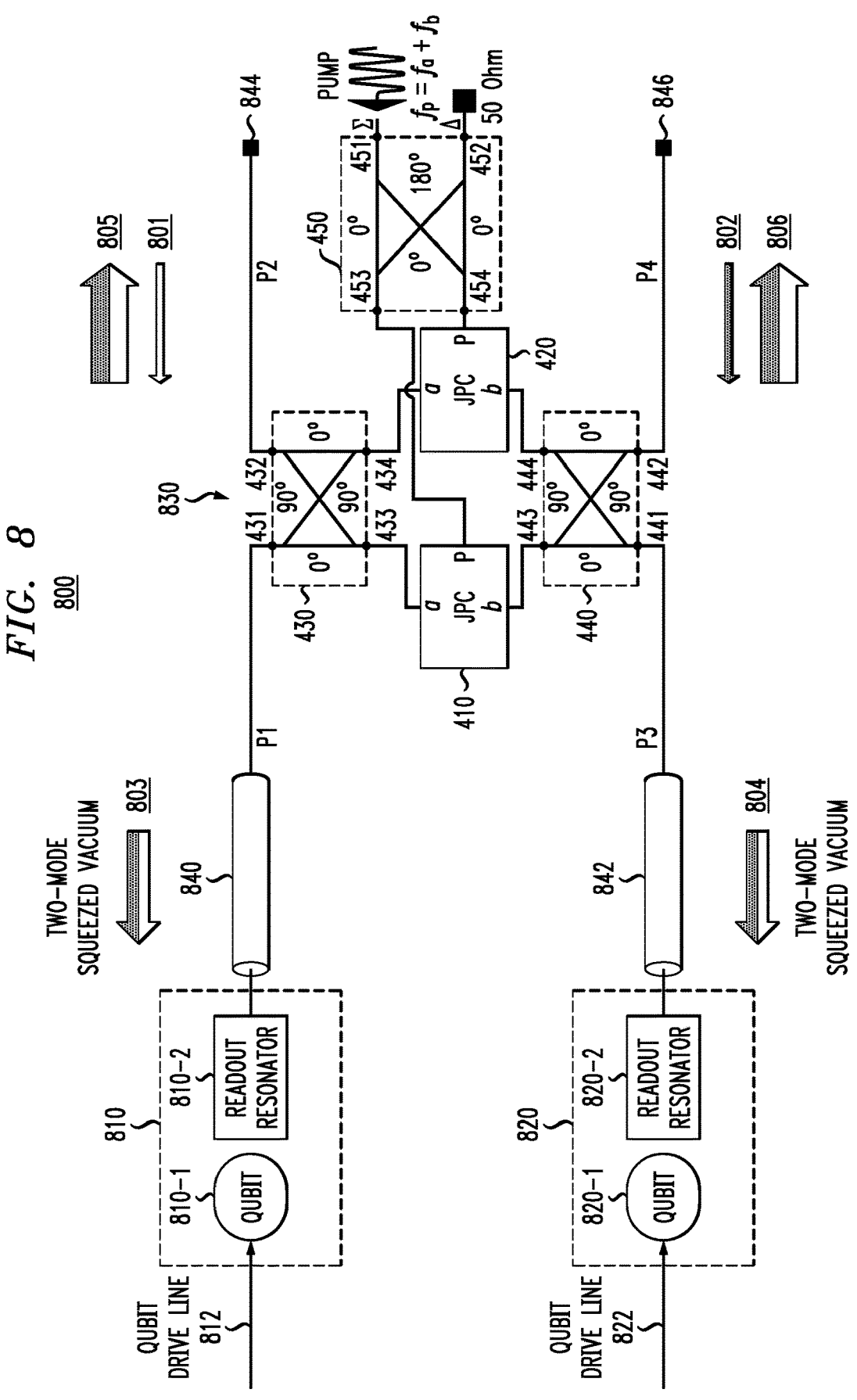
FIG. 8 schematically illustrates a quantum system which implements a nondegenerate through Josephson amplifier device to facilitate remote entanglement between superconducting qubits, according to an exemplary embodiment of the disclosure FIG. 9 schematically illustrates a quantum computing system, according to an exemplary embodiment of the disclosure.

For example, FIG. 8 schematically illustrates a quantum system which implements a nondegenerate through Josephson amplifier device to facilitate remote entanglement between superconducting qubits, according to an exemplary embodiment of the disclosure. In particular, FIG. 8 schematically illustrates a quantum system 800 comprising a first qubit/readout resonator system 810, a second qubit/readout resonator system 820, a nondegenerate through Josephson amplifier device 830, and superconducting transmission lines 840 and 842. The first qubit/readout resonator system 810 comprises a first superconducting qubit 810-1 and first readout resonator 810-2 that is coupled to the first superconducting qubit 810-1. The second qubit/readout resonator system 820 comprises a second superconducting qubit 820-1 and a second readout resonator 820-2 that is coupled to the second superconducting qubit 820-1. A first qubit drive line 812 is coupled to the first superconducting qubit 810-1, and a second qubit drive line 822 is coupled to the second superconducting qubit 820-1.

In some embodiments, the nondegenerate through Josephson amplifier device 830 is implemented using the four-port nondegenerate through Josephson amplifier architecture as shown in FIG. 4, the details of which will not be repeated. The port P1 of the nondegenerate through Josephson amplifier device 830 is coupled to the first readout resonator 810-2 via the superconducting transmission line 840. The port P3 of the nondegenerate through Josephson amplifier device 830 is coupled to the second readout resonator 820-2 via the superconducting transmission line 842. Furthermore, in some embodiments, the ports P2 and P4 of the nondegenerate through Josephson amplifier device 830 are terminated using 50 Ohm cold terminations 844 and 846, respectively. In some embodiments, at least one of the ports P2 and P4 (or both) is coupled to readout circuitry to verify an entanglement state of the first and second superconducting qubits 810-1 and 810-2.

In some embodiments, a two-qubit entanglement operation is performed as follows. The nondegenerate through Josephson amplifier device 830 comprises quantum noise that is present on the ports P2 and P4 thereof (e.g., quantum noise that exists in the cryogenic environment at the base-temperature stage of a dilution refrigeration system). In FIG. 8, the quantum noise is schematically illustrated by the non-shaded arrow 801 that is input to port P2, and the shaded arrow 802 that is input to port P4. The nondegenerate through Josephson amplifier device 830 is driven by applying a pump control signal Pump to the pump port, wherein the pump control signal has a frequency that is equal to the sum of the center frequencies of the resonant modes a and b of the nondegenerate through Josephson amplifier device 830. In response to the pump control signal, the nondegenerate through Josephson amplifier device 830 amplifies the quantum noise 801 and 802 on ports P2 and P4, and outputs a first two-mode squeezed vacuum signal 803 from port P1 and a second two-mode squeezed vacuum signal 804 from port P3.

The first and second two-mode squeezed vacuum signals 803 and 804 are transmitted to the first and second readout resonators 810-2 and 820-2, respectively, via the first and second superconducting transmission lines 840 and 842. The first superconducting transmission line 840 applies the first two-mode squeezed vacuum signal 803 to the first superconducting readout resonator 810-2, and the second superconducting transmission line 842 applies the second two-mode squeezed vacuum signal 804 to the second superconducting readout resonator 820-2. At the same time, a first qubit control signal (with a frequency similar to the transition frequency of the first superconducting qubit 810-1) is applied on the first qubit drive line 812, and a second qubit control signal (with a frequency similar to the transition frequency of the second superconducting qubit 820-1) is applied on the second qubit drive line 822.

The first and second two-mode squeezed vacuum signals 803 and 804 and the first and second qubit control signals are applied to the respective first and second qubit/readout resonator systems 810 and 820 for a period of time that is sufficient to reach a stable entanglement state, e.g., a Bell state which represents a maximally entangled quantum state of the first and second superconducting quits 810-1 and 820-1. The signals that are reflected out from the first and second readout resonators 810-2 and 820-2, are transmitted back, via the first and second superconducting transmission lines 840 and 842, to the respective ports P1 and P3 of the nondegenerate through Josephson amplifier device 830. The nondegenerate through Josephson amplifier device 830 then amplifies and mixes the reflected signals to generate amplified output signals 805 and 806 on ports P2 and P4, each of which individually represents the quantum state of the two-qubit entanglement. Again, while FIG. 8 shows both ports P2 and P4 terminated, the ports (i.e., Port P2 and P4) can be connected to readout electronics to verify the two-qubit entanglement state (e.g., by analyzing the amplified output signal 805 and 806).

Figure 9:
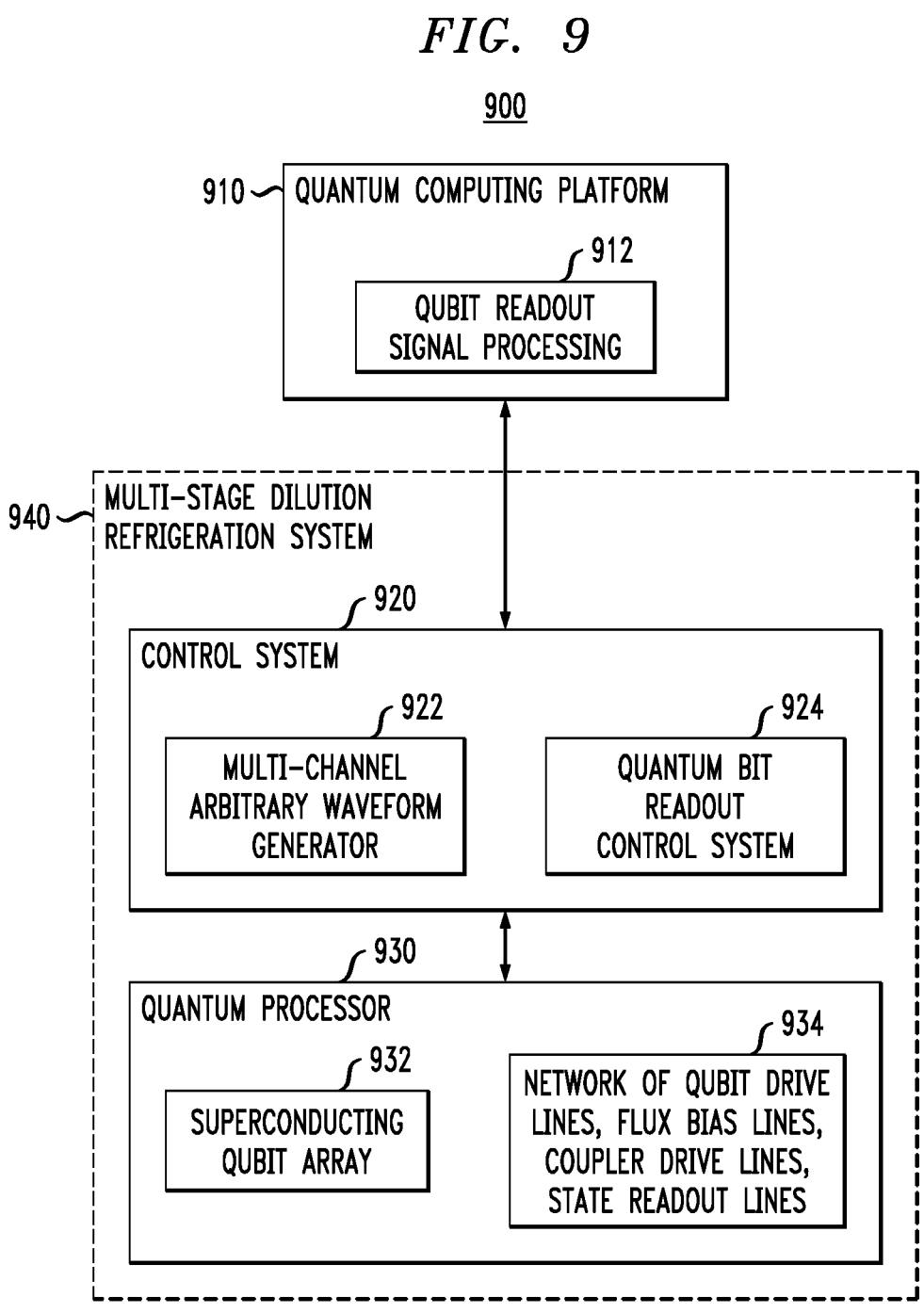

FIG. 9 schematically illustrates a quantum computing system 900 which comprises a quantum computing platform

910, a control system 920, and a quantum processor 930. In some embodiments, the quantum computing platform 910 implements software control programs such as a software-based qubit readout signal processing system 912 to processes the digital qubit readout signals that are generated by a qubit readout system such as discussed above, as well as perform other software-controlled processes such as qubit calibration operations. In addition, in some embodiments, the control system 920 comprises a multi-channel arbitrary waveform generator 922, and a quantum bit readout control system 924. The quantum processor 930 comprises a solid-state semiconductor chip having a superconducting qubit array 932 and a network 934 of qubit drive lines, coupler flux-bias control lines, and qubit state readout lines, and other circuit QED components that may be needed for a given application or quantum system configuration.

In some embodiments, the control system 920 and the quantum processor 930 are disposed in a dilution refrigeration system 940 which can generate cryogenic temperatures that are sufficient to operate components of the control system 920 for quantum computing applications. For example, the quantum processor 930 may need to be cooled down to near-absolute zero, e.g., 10-15 millikelvin (mK), to allow the superconducting qubits to exhibit quantum behaviors. In some embodiments, the dilution refrigeration system 940 comprises a multi-stage dilution refrigerator where the components of the control system 920 can be maintained at different cryogenic temperatures, as needed. For example, while the quantum processor 930 may need to be cooled down to, e.g., 10-15 mK, the circuit components of the control system 920 may be operated at cryogenic temperatures greater than 10-15 mK (e.g., cryogenic temperatures in a range of 3K-4K), depending on the configuration of the quantum computing system. In some embodiments, the entirely of the control system 920, or some components thereof, are disposed in a room temperature environment.

In some embodiments, the superconducting qubit array 932 comprises a quantum system of superconducting qubits, superconducting qubit couplers, and other components commonly utilized to support quantum processing using qubits. The number of superconducting qubits of the qubit array 932 can be on the order of tens, hundreds, thousands, or more, etc. The network 934 of qubit drive lines, coupler flux bias control lines, and qubit state readout lines, etc., are configured to apply microwave control signals to superconducting qubits and coupler circuitry in the superconducting qubit array 932 to perform various types of gate operations, e.g., single-gate operations, entanglement gate operations (e.g., CPHASE gate operation), perform error correction operations, etc., as well read the quantum states of the superconducting qubits. For example, as noted above, microwave control pulses are applied to the qubit drive lines of respective superconducting qubits to change the quantum state of the superconducting qubits (e.g., change the quantum state of a given qubit between the ground state and excited state, or to a superposition state) when executing quantum information processing algorithms.

Furthermore, as noted above, the state readout lines comprise readout resonators that are coupled to respective superconducting qubits. The state of a given superconducting qubit can be determined through microwave transmission or reflection measurements using the readout ports of the readout resonator. The states of the superconducting qubits are read out after executing a quantum algorithm. In some embodiments, a dispersive readout operation is performed in which a change in the resonant frequency of a given readout resonator, which is coupled to a given superconducting qubit, is utilized to readout the state (e.g., ground or excited state) of the given superconducting qubit.

The network 934 of qubit drive lines, coupler flux bias control lines, and qubit state readout lines, etc., is coupled to the control system 920 through a suitable hardware input/output (I/O) interface, which couples I/O signals between the control system 920 and the quantum processor 930. For example, the hardware I/O interface may comprise various types of hardware and components, such as RF cables, wiring, RF elements, optical fibers, heat exchanges, filters, amplifiers, isolators, etc.

In some embodiments, the multi-channel arbitrary waveform generator (AWG) 922 and other suitable microwave pulse signal generators are configured to generate the microwave control pulses that are applied to the qubit drive lines, and the coupler drive lines to control the operation of the superconducting qubits and associated qubit coupler circuitry, when performing various gate operations to execute a given certain quantum information processing algorithm. In some embodiments, the multi-channel AWG 922 comprises a plurality of AWG channels, which control respective superconducting qubits within the superconducting qubit array 932 of the quantum processor 930. In some embodiments, each AWG channel comprises a baseband signal generator, a digital-to-analog converter (DAC) stage, a filter stage, a modulation stage, an impedance matching network, and a phase-locked loop system to generate local oscillator (LO) signals (e.g., quadrature LO signals LO_I and LO_Q) for the respective modulation stages of the respective AWG channels.

In some embodiments, the multi-channel AWG 922 comprises a quadrature AWG system which is configured to process quadrature signals, wherein a quadrature signal comprises an in-phase (I) signal component, and a quadrature-phase (Q) signal component. In each AWG channel the baseband signal generator is configured to receive baseband data as input (e.g., from the quantum computing platform), and generate digital quadrature signals I and Q which represent the input baseband data. In this process, the baseband data that is input to the baseband signal generator for a given AWG channel is separated into two orthogonal digital components including an in-phase (I) baseband component and a quadrature-phase (Q) baseband component. The baseband signal generator for the given AWG channel will generate the requisite digital quadrature baseband IQ signals which are needed to generate an analog waveform (e.g., sinusoidal voltage waveform) with a target center frequency that is configured to operate or otherwise control a given quantum bit that is coupled to the output of the given AWG channel.

The DAC stage for the given AWG channel is configured to convert a digital baseband signal (e.g., a digital IQ signal output from the baseband signal generator) to an analog baseband signal (e.g., analog baseband signals I(t) and Q(t)) having a baseband frequency. The filter stage for the given AWG channel is configured to filter the IQ analog signal components output from the DAC stage to thereby generate filtered analog IQ signals. The modulation stage for the given AWG channel is configured to perform analog IQ signal modulation (e.g., single-sideband (SSB) modulation) by mixing the filtered analog signals I(t) and Q(t), which are output from the filter stage, with quadrature LO signals (e.g., an in-phase LO signal (LO_I) and a quadrature-phase LO signal (LO_Q)) to generate and output an analog RF signal (e.g., a single-sideband modulated RF output signal).

In some embodiments, the quantum bit readout control system 924 comprises a microwave pulse signal generator that is configured to apply a microwave tone to a given readout resonator line of a given superconducting qubit to perform a readout operation to readout the state of the given superconducting qubit, as well as circuitry that is configured to process the readout signal generated by the readout resonator line to determine the state of the given superconducting qubit, using techniques known to those of ordinary skill in the art.

The quantum computing platform 910 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 910 comprises a hardware architecture of processors, memory, etc., which is configured to control the execution of quantum applications, and interface with the control system 920 to (i) generate digital control signals that are converted to analog microwave control signals by the control system 920, to control operations of the quantum processor 930 when executing a given quantum application, and (ii) to obtain and process digital signals received from the control system 920, which represent the processing results generated by the quantum processor 930 when executing various gate operations for a given quantum application.

Figure 10:
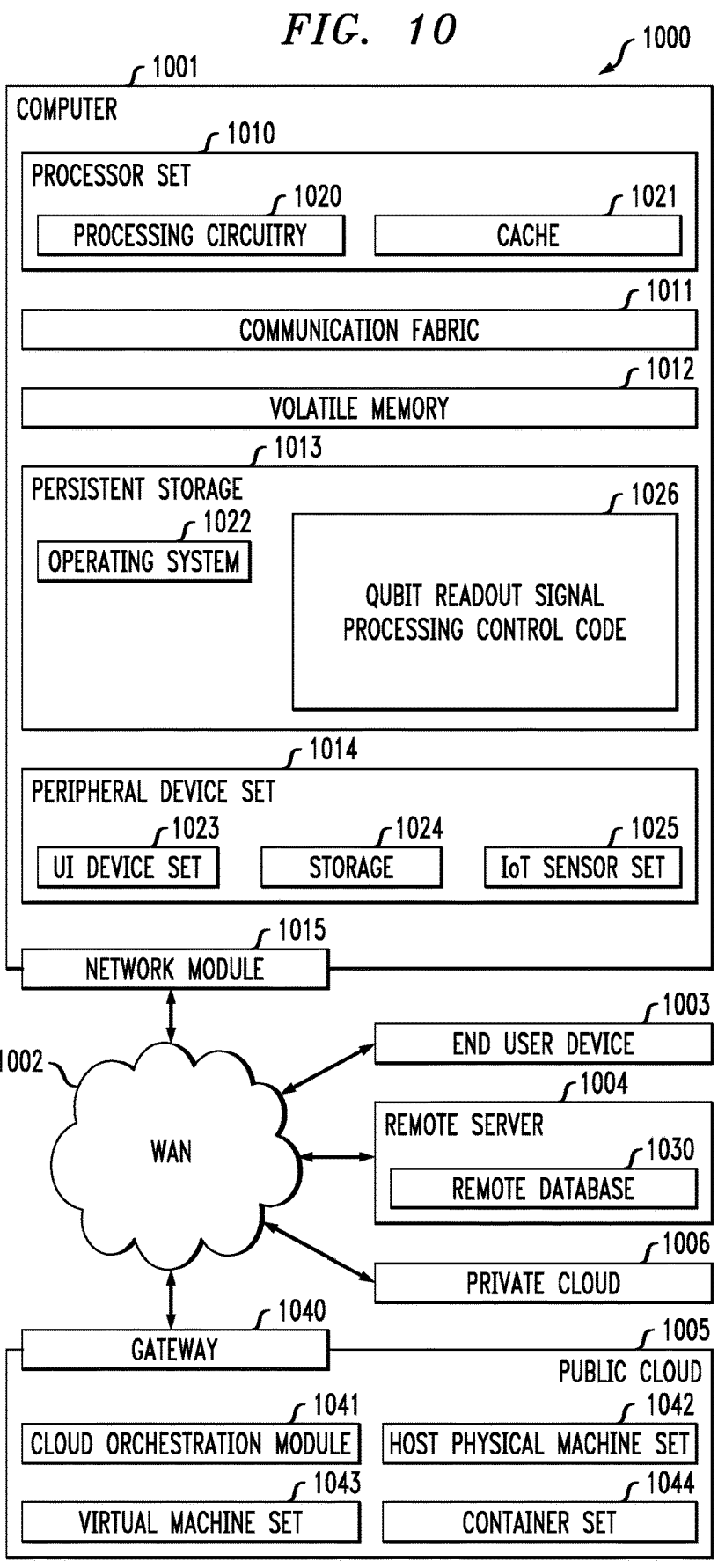
FIG. 10 schematically illustrates an exemplary architecture of a computing environment for hosting a quantum computing platform and performing quantum information processing, according to an exemplary embodiment of the disclosure.

In some exemplary embodiments, the quantum computing platform 910 of the quantum computing system 900 may be implemented using any suitable computing system architecture (e.g., as shown in FIG. 10) which is configured to implement methods to support quantum computing operations by executing computer readable program instructions that are embodied on a computer program product which includes a computer readable storage medium (or media) having such computer readable program instructions thereon for causing a processor to perform control methods as discussed herein.

The quantum computing platform 910 comprises a software and hardware platform which comprises various software layers that are configured to perform various functions, including, but not limited to, generating and implementing various quantum applications using suitable quantum programming languages, configuring and implementing various quantum gate operations, compiling quantum programs into a quantum assembly language, implementing and utilizing a suitable quantum instruction set architecture (ISA), performing calibration operations to calibrate the quantum circuit elements and gate operations, etc. In addition, the quantum computing platform 910 comprises a hardware architecture of processors, memory, etc., which is configured to control the execution of quantum applications, and interface with the control system 920 to (i) generate digital control signals that are converted to analog microwave control signals by the control system 920, to control operations of the quantum processor 930 when executing a given quantum application, and (ii) to obtain and process digital signals received from the control system 920, which represent the processing results generated by the quantum processor 930 when executing various gate operations for a given quantum application. In some exemplary embodiments, the quantum computing platform 910 of the quantum computing system 900 may be implemented using any suitable computing system architecture (e.g., as shown in FIG. 10) which is configured to implement methods to support quantum computing operations by executing computer readable program instructions that are embodied on a computer program product which includes a computer readable storage medium (or media) having such computer readable program instructions thereon for causing a processor to perform control methods as discussed herein.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random-access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1000 of FIG. 10 contains an example of an environment for the execution of at least some of the computer code involved in performing the inventive methods, such as qubit readout signal processing control code in block 1026 for controlling qubit readout operations and determining the quantum states of qubits by processing digitized qubit readout signals using the software-based qubit readout signal processing system 912 of FIG. 9. In addition to block 1026, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and block 1026, as identified above), peripheral device set 1014 (including user interface (UI), device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044.

Computer 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

Processor set 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be stored in block 1026 in persistent storage 1013.

Communication fabric 1011 is the signal conduction paths that allow the various components of computer 1001 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 1012 is any type of volatile memory now known or to be developed in the future. Examples include dynamic type random access memory (RAM) or static type RAM. Typically, the volatile memory is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

Persistent storage 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid-state storage devices. Operating system 1022 may take several forms, such as various known proprietary operating systems or open source Portable Operating System Interface type operating systems that employ a kernel. The code included in block 1026 typically includes at least some of the computer code involved in performing the inventive methods.

Peripheral device set 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

Network module 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on.

Remote server 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

Public cloud 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A device, comprising:
   a nondegenerate through quantum-limited amplifier comprising a first port, a second port, and a third port;
   wherein the first port is configured to receive first quantum signals which comprise frequencies within a first frequency band;
   wherein the second port is configured to receive second quantum signals which comprise frequencies within a second frequency band, wherein the second frequency band is non-overlapping with the first frequency band;
   wherein the nondegenerate through quantum-limited amplifier is configured to:
   amplify the first quantum signals;
   amplify the second quantum signals and convert the frequencies of the second quantum signals to frequencies that fall within the first frequency band; and
   output the amplified first quantum signals and the amplified frequency-converted second quantum signals from the third port.

2. The device of claim 1, wherein:
   the nondegenerate through quantum-limited amplifier comprises a fourth port; and
   the nondegenerate through quantum-limited amplifier is configured to amplify the second quantum signals, amplify and convert the frequencies of the first quantum signals to frequencies within the second frequency band, and output the amplified second quantum signals and the amplified frequency-converted first quantum signals from the fourth port.

3. The device of claim 1, wherein the nondegenerate through quantum-limited amplifier comprises a control port, wherein the control port is configured to receive a control signal which comprises a coherent microwave signal at frequency that corresponds to a sum of a first center frequency of the first frequency band and a second center frequency of the second frequency band.

4. The device of claim 1, wherein the nondegenerate through quantum-limited amplifier comprises:
   a first nondegenerate three-wave mixing device; and
   a second nondegenerate three-wave mixing device;
   wherein the first nondegenerate three-wave mixing device and the second nondegenerate three-wave mixing device are coupled in parallel.

5. The device of claim 4, wherein:
   the first nondegenerate three-wave mixing device comprises a first mode input port, a second mode input port, and a common mode input port;
   the second nondegenerate three-wave mixing device comprises a first mode input port, a second mode input port, and a common mode input port;
   the first mode input ports of the first and second nondegenerate three-wave mixing devices are coupled through a first hybrid coupler;
   the second mode input ports of the first and second nondegenerate three-wave mixing devices are coupled through a second hybrid coupler; and
   the common mode input ports of the first and second nondegenerate three-wave mixing devices are coupled through a third hybrid coupler.

6. The device of claim 5, wherein:
   the first hybrid coupler comprises a 90 degree hybrid coupler;
   the second hybrid coupler comprises a 90 degree hybrid coupler; and
   the third hybrid coupler comprises a 180 degree hybrid coupler.

7. The device of claim 4, wherein:
   the first nondegenerate three-wave mixing device comprises a first Josephson parametric converter amplifier; and
   the second nondegenerate three-wave mixing device comprises a second Josephson parametric converter amplifier.

8. A system, comprising:

a first quantum array comprising first quantum bits, first readout resonators coupled to respective ones of the first quantum bits, and a first communication bus coupled to the first readout resonators, wherein the first readout resonators are configured generate first readout signals which correspond to quantum states of the first quantum bits, and output the first readout signals on the first communication bus, wherein the first readout signals comprise frequencies within a first frequency band;

a second quantum array comprising second quantum bits, second readout resonators coupled to respective ones of the second quantum bits, and a second communication bus coupled to the second readout resonators, wherein the second readout resonators are configured generate second readout signals which correspond to quantum states of the second quantum bits, and output the second readout signals on the second communication bus, wherein the second readout signals comprise frequencies within a second frequency band; and a nondegenerate through quantum-limited amplifier comprising a first port, a second port, and a third port;

wherein the first port is coupled to the first communication bus and configured to receive the first readout signals;

wherein the second port is coupled to the second communication bus and configured to receive the second readout signals; and wherein the nondegenerate through quantum-limited amplifier is configured to amplify the first readout signals, amplify and convert the frequencies of the second readout signals to frequencies within the first frequency band, and output the amplified first readout signals and the amplified frequency-converted second readout signals from the third port.

9. The system of claim 8, wherein:

the nondegenerate through quantum-limited amplifier comprises a fourth port; and the nondegenerate through quantum-limited amplifier is configured to amplify the second readout signals, amplify and convert the frequencies of the first readout signals to frequencies within the second frequency band, and output the amplified second readout signals and the amplified frequency-converted first readout signals from the fourth port.

10. The system of claim 8, wherein the nondegenerate through quantum-limited amplifier comprises a control port, wherein the control port is configured to receive a control signal which comprises a coherent microwave signal at frequency that corresponds to a sum of a first center frequency of the first frequency band and a second center frequency of the second frequency band.

11. The system of claim 8, wherein the nondegenerate through quantum-limited amplifier comprises:

a first nondegenerate three-wave mixing device; and a second nondegenerate three-wave mixing device;

wherein the first nondegenerate three-wave mixing device and the second nondegenerate three-wave mixing device are coupled in parallel.

12. The system of claim 11, wherein:

the first nondegenerate three-wave mixing device comprises a first mode input port, a second mode input port, and a common mode input port;

the second nondegenerate three-wave mixing device comprises a first mode input port, a second mode input port, and a common mode input port;

the first mode input ports are coupled through a first hybrid coupler;

the second mode input ports are coupled through a second hybrid coupler; and the common mode input ports are coupled through a third hybrid coupler.

13. The system of claim 12, wherein:

the first hybrid coupler comprises a 90 degree hybrid coupler;

the second hybrid coupler comprises a 90 degree hybrid coupler; and the third hybrid coupler comprises a 180 degree hybrid coupler.

14. The system of claim 11, wherein:

the first nondegenerate three-wave mixing device comprises a first Josephson parametric converter amplifier; and the second nondegenerate three-wave mixing device comprises a second Josephson parametric converter amplifier.

15. The system of claim 11, further comprising:

a second quantum-limited amplifier having an input coupled to the third port of the nondegenerate through quantum-limited amplifier; and a downconverter system coupled to an output of the second quantum-limited amplifier;

wherein the downconverter system is configured to downconvert the frequencies of the first readout signals and the frequencies of the frequency-converted second readout signals to lower frequencies;

wherein the downconverter system comprises a downconversion frequency separation constraint which specifies a minimum frequency spacing of the readout signals to enable downconversion of the readout signals;

wherein the nondegenerate through quantum-limited amplifier is configured to convert the frequencies of the second readout signals to frequencies within the first frequency band while maintaining sufficient separation between the frequencies of the first readout signals and the frequencies of the frequency-converted second readout signals to meet the downconversion frequency separation constraint.

16. A system, comprising:

a first quantum bit;

a first readout resonator coupled to the first quantum bit;

a second quantum bit;

a second readout resonator coupled to the second quantum bit; and a nondegenerate through quantum-limited amplifier comprising a first port, a second port, a third port, and a fourth port;

wherein the first port is coupled to the first readout resonator;

wherein the second port is coupled to the second readout resonator; and wherein the nondegenerate through quantum-limited amplifier is configured to amplify quantum noise on the third port and quantum noise on the fourth port to generate a first two-mode squeezed vacuum signal on the first port which is applied to the first readout resonator, and generate a second two-mode squeezed vacuum signal on the second port which is applied to the second readout resonator, wherein the first two-mode squeezed vacuum signal and the second two-mode squeezed vacuum signal facilitate an entanglement operation between the first quantum bit and the second quantum bit.

17. The system of claim 16, wherein the nondegenerate through quantum-limited amplifier comprises a control port, wherein the control port is configured to receive a control signal which comprises a coherent microwave signal at frequency that corresponds to a sum of a resonance frequency of the first readout resonator and a resonance frequency of the second readout resonator.

18. The system of claim 16, wherein the nondegenerate through quantum-limited amplifier comprises:

a first nondegenerate three-wave mixing device; and a second nondegenerate three-wave mixing device;

wherein the first nondegenerate three-wave mixing device and the second nondegenerate three-wave mixing device are coupled in parallel.

19. The system of claim 18, wherein:

the first nondegenerate three-wave mixing device comprises a first mode input port, a second mode input port, and a common mode input port;

the second nondegenerate three-wave mixing device comprises a first mode input port, a second mode input port, and a common mode input port;

the first mode input ports are coupled through a first hybrid coupler;

the second mode input ports are coupled through a second hybrid coupler; and the common mode input ports are coupled through a third hybrid coupler.

20. The system of claim 19, wherein:

the first hybrid coupler comprises a 90 degree hybrid coupler;

the second hybrid coupler comprises a 90 degree hybrid coupler; and the third hybrid coupler comprises a 180 degree hybrid coupler.

* * * * *